United States Patent
Veeramachaneni et al.

(10) Patent No.: US 10,713,384 B2
(45) Date of Patent: Jul. 14, 2020

(54) METHODS AND APPARATUS FOR TRANSFORMING AND STATISTICALLY MODELING RELATIONAL DATABASES TO SYNTHESIZE PRIVACY-PROTECTED ANONYMIZED DATA

(71) Applicants: Massachusetts Institute of Technology, Cambridge, MA (US); Accenture Global Solutions Limited, Dublin (IE)

(72) Inventors: Kalyan Kumar Veeramachaneni, Brighton, MA (US); Neha Patki, San Jose, CA (US); Kishore Prabhakar Durg, Bangalore (IN); Jeffrey Steven Wilkinson, Fishers, IN (US); Sunder Ranganathan Nochilur, Bangalore (IN)

(73) Assignees: Massachusetts Institute of Technology, Cambridge, MA (US); ACCENTURE GLOBAL SOLUTIONS LIMITED, Dublin (IE)

( * ) Notice: Subject to any disclaimer, the term of this patent is extended or adjusted under 35 U.S.C. 154(b) by 228 days.

(21) Appl. No.: 15/836,706

(22) Filed: Dec. 8, 2017

(65) Prior Publication Data

US 2018/0165475 A1     Jun. 14, 2018

Related U.S. Application Data

(60) Provisional application No. 62/447,340, filed on Jan. 17, 2017, provisional application No. 62/432,474, filed on Dec. 9, 2016.

(51) Int. Cl.
*G06F 21/62*     (2013.01)
*G06N 7/00*     (2006.01)
(Continued)

(52) U.S. Cl.
CPC .......... *G06F 21/6254* (2013.01); *G06F 16/00* (2019.01); *G06F 16/221* (2019.01);
(Continued)

(58) Field of Classification Search
CPC ............ G06F 21/6254; G06F 16/2282; G06F 16/284; G06F 16/221; G06F 2221/2117; G06F 16/00; G06N 20/00; G06N 7/005
(Continued)

(56) References Cited

U.S. PATENT DOCUMENTS 8,676,731 B1 * 3/2014 Sathyanarayana ............................ G06K 9/00442
706/12
8,732,015 B1 * 5/2014 Beckerman ........ G06Q 30/0242
705/14.46
(Continued)

OTHER PUBLICATIONS

Airbnb. https://www.airbnb.com/, accessed Apr. 5, 2018, 11 pages.
(Continued)

*Primary Examiner* — Aravind K Moorthy
(74) *Attorney, Agent, or Firm* — Smith Baluch LLP

(57) ABSTRACT

A relational database is transformed so as to obfuscate secure and/or private aspects of data contained in the database, while preserving salient elements of the data to facilitate data analysis. A restructured database is generatively modeled, and the model is sampled to create synthetic data that maintains sufficiently similar (or the same) mathematical properties and relations as the original data stored in the database. In one example, various statistics at the intersection of related database tables are determined by modeling data using an iterative multivariate approach. Synthetic data may be sampled from any part of the modeled database, wherein the synthesized data is "realistic" in that it statistically mimics the original data in the database. The generation of such synthetic data allows publication of bulk data freely and on-demand (e.g., for data analysis purposes), without the risk of security/privacy breaches.

26 Claims, 18 Drawing Sheets

(51) Int. Cl.
  *G06N 20/00* (2019.01)
  *G06F 16/22* (2019.01)
  *G06F 16/28* (2019.01)
  *G06F 16/00* (2019.01)

(52) U.S. Cl.
  CPC ........ *G06F 16/2282* (2019.01); *G06F 16/284* (2019.01); *G06N 7/005* (2013.01); *G06N 20/00* (2019.01); *G06F 2221/2117* (2013.01)

(58) Field of Classification Search
  USPC .......................................................... 726/26
  See application file for complete search history.

(56) References Cited

U.S. PATENT DOCUMENTS

| | | | | |
|---|---|---|---|---|
| 9,691,026 | B1* | 6/2017 | Freese | G06N 5/022 |
| 2002/0049701 | A1* | 4/2002 | Nabe | G06Q 30/02 |
| 2002/0103793 | A1* | 8/2002 | Koller | G06F 16/2462 |
| 2005/0049991 | A1* | 3/2005 | Aggarwal | G06F 16/283 |
| 2014/0058539 | A1* | 2/2014 | Park | G05B 15/02 |
| | | | | 700/50 |
| 2014/0279729 | A1* | 9/2014 | Delaney | G06F 16/367 |
| | | | | 706/12 |
| 2014/0317093 | A1* | 10/2014 | Sun | G06F 16/2255 |
| | | | | 707/722 |
| 2014/0344013 | A1* | 11/2014 | Karty | G06Q 30/0201 |
| | | | | 705/7.29 |
| 2015/0363498 | A1* | 12/2015 | Brown | G06F 16/2457 |
| | | | | 707/722 |
| 2016/0132697 | A1* | 5/2016 | Simske | G06F 21/6254 |
| | | | | 726/26 |
| 2017/0006135 | A1* | 1/2017 | Siebel | G06F 8/10 |
| 2017/0220683 | A1* | 8/2017 | Vaquero Gonzalez | G06F 16/951 |
| 2017/0228651 | A1* | 8/2017 | Yamamoto | G16H 50/20 |
| 2018/0357669 | A1* | 12/2018 | Tokuhisa | G06Q 30/02 |

OTHER PUBLICATIONS

Blockeel, H. et al., "Experiments in Predicting Biodegradability," Applied Artificial Intelligence, vol. 18, No. 2, pp. 157-181 (2004).

Debnath, A. K. et al., "Structure-Activity Relationship of Mutagenic Aromatic and Heteroaromatic Nitro Compounds. Correlation with Molecular Orbital Energies and Hydrophobicity," J. Med. Chem., vol. 34, pp. 786-797 (1991).

Getoor, L. et al., "Learning Probabilistic Relational Models," IJCAI, vol. 99, pp. 1300-1309 (1999).

Kaggle airbnb new user bookings. https://www.kaggle.com/c/airbnb-recruiting-new-user-bookings, accessed Apr. 5, 2018, 5 pages.

Kaggle rossman store sales. https://www.kaggle.com/c/rossmann-store-sales, accessed Apr. 5, 2018, 5 pages.

Kaggle. https://www.kagle.com/, accessed Apr. 5, 2018, 6 pages.

Kramer, S. et al., "Propositionalization Approaches to Relational Data Mining," pp. 262-291, Springer (2001).

Massey, "The Kolmogorov-Smirnov Test for Goodness of Fit," Journal of Statistical Association, vol. 46, No. 253, pp. 68-78 (Mar. 1951).

Motl, J., "The CTU Prague Relational Learning Repository," arXiv:1511.03086v1, 7 pages (Nov. 2015).

Rossmann mein drogeriemarkt. https://www.rossmann.de/verbraucherportal.html, accessed Apr. 5, 2018, 6 pages.

Rüschendorf, L., "Mathematical Risk Analysis," Chapter 1, 413 pages, Springer (2013).

Telstra network disruptions. https://www.kaggle.com/c/telstra-recruiting-network, accessed Apr. 5, 2018, 5 pages.

* cited by examiner

| ID | $T_0$ | $T_1$ | $T_2$ | $T_3$ | $A_{00}$ | $A_{01}$ | ... | $C_{66}$ | $\mu_0$ | $\sigma_0^2$ | ... | $\sigma_6^2$ |
|---|---|---|---|---|---|---|---|---|---|---|---|---|
| | | | | | | | | | | | | |
| 33 | | | | | | | | | | | | |
| | | | | | | | | | | | | |

Extended table 910

Original columns | Covariances | Distributions

METHODS AND APPARATUS FOR TRANSFORMING AND STATISTICALLY MODELING RELATIONAL DATABASES TO SYNTHESIZE PRIVACY-PROTECTED ANONYMIZED DATA

CROSS-REFERENCE TO RELATED APPLICATIONS

This application claims a priority benefit, under 35 U.S.C. § 119(e), of U.S. Application No. 62/432,474, entitled "Methods and Apparatus for Building Generative Models of Relational Databases to Create Synthetic Data Based on such Models," filed on Dec. 9, 2016, and U.S. Application No. 62/447,340, entitled "Methods and Apparatus for Building Generative Models of Relational Databases to Create Synthetic Data Based on such Models," filed on Jan. 17, 2017, each of which applications is hereby incorporated herein by reference in its entirety.

BACKGROUND

Businesses are looking to make data-driven decisions by using machine learning methods. Unfortunately, many organizations who wish to adopt machining learning techniques to analyze data and make decisions based on data analysis face various challenges. For example, some organizations do not have the resources to collect large datasets that are relevant to their business. Others struggle with hiring a sufficient number and/or appropriately-skilled data scientists. Another significant challenge for many organizations is that the data they wish to analyze may include sensitive data (e.g., information that is proprietary, confidential, and/or under protection order, secrecy order, or requires special/government clearance for access) or private data (e.g., personal data containing identifying particulars of an individual or entity).

More specifically, for new or resource-constrained organizations (e.g., a new tech startup), one barrier to analyzing data is not having enough of it. New and traditional machine learning techniques assume a large number of data points that would come with a large user base. For example, the recently published AlphaGo system samples 30 million data points after analyzing millions of games (see Silver et al., "Mastering the game of go with deep neural networks and tree search," Nature, 529 (7587):484-489, 01 2016), and ImageNet uses a neural network trained with 15 million images from a publicly available dataset (see Krizhevsky et al., "Imagenet classification with deep convolutional neural networks," Advances in Neural Information Processing Systems 25, pages 1097-1105, F. Pereira, C. J. C. Burges, L. Bottou, and K. Q. Weinberger, editors, Curran Associates, Inc., 2012). While businesses may not want or be able to perform sophisticated analysis on large amounts of data, the general trend in machine learning is to use more data.

Additionally, organizations wishing to scale their data science efforts must increase the number of people who can work with their data. This may be compounded by the fact that the data to be analyzed may contain sensitive and/or private information that should not be freely shared with unauthorized individuals (e.g., a team of data scientists). Thus, to be able to share data for analysis, the organization would need to somehow anonymize sensitive and/or private information or remove portions of it entirely. Both tasks of anonymizing sensitive and/or private information, and omitting portions of information, are non-trivial and subject to flaws.

Anonymizing person-specific data is an option that allows organizations to publish data without leaking sensitive information like names or social security numbers. However, deciding which information to anonymize and which to share is a non-trivial task. For example, organizations in the past have freely released the date of birth, gender, and zip code of their customers. Alarmingly, these three pieces of information uniquely identify at least 87% of United States citizens. Furthermore, it may be possible to cross-reference information from multiple sources to de-anonymize additional information.

Omitting sensitive data is a different option that endeavors to protect the security and/or privacy of certain information. In particular, a conventional k-anonymity scheme purposefully omits individual entries of data in rows of a database to ensure that any row of data is indistinguishable from at least k−1 others. While this provides some extent of security, it nonetheless fundamentally changes the structure of the data. The modifications force anyone working with the data to change their approach.

SUMMARY

In view of the foregoing, the Inventors have recognized and appreciated that the ability to usefully analyze data in larger quantities and by greater numbers of data scientists would be significantly facilitated by improved techniques for maintaining the security and/or privacy of the data to be analyzed. To this end, inventive methods, apparatus and systems disclosed herein relate generally to transforming relational databases so as to obfuscate secure and/or private aspects of data contained in the database while preserving the salient elements of the data to facilitate data analysis. In example implementations discussed in further detail below, the relational database is transformed (e.g., by restructuring the database) and then statistically modeled. Subsequently, synthetic data is generated based on the statistical model of the transformed database, such that the synthetic data maintains sufficiently similar or the same mathematical properties and relations as the original data stored in the database. The generation of such synthetic data allows publication of bulk data freely and on-demand (e.g., for data analysis purposes), without the risk of security/privacy breaches.

In one example, a methodology referred to herein as "Synthetic Data Vault" (SDV), builds a generative model of a relational database and samples from the model to create synthetic data. In one aspect, the SDV computes various statistics at the intersection of related database tables and models the data using a multivariate modeling approach. The SDV iterates through all possible relations, ultimately creating a model for the entire database. Once this model is generated, the same relational information allows the SDV to synthesize data by sampling from any part of the database, wherein the synthesized data is "realistic" in that it statistically mimics the original data in the database.

Present technology includes systems, apparatus, and methods that generate synthetic data by building a fully generative model of the original database. In some inventive aspects, a computer-implemented method for storing and retrieving data in a computer memory to improve the functionality of a computer that comprises the computer memory by protecting the privacy of first data contained in a relational database that is stored in the computer memory is disclosed. At least one first processor of the computer—A) restructures the relational database to generate a statistical model of the relational database. And, the at least one first processor of the computer or another processor of another computer synthesizes anonymized data based on the statistical model of the relational database generated in A). The anonymized data statistically mimics but does not duplicate at least a portion of the first data in the relational database and thereby protects the privacy of at least the portion of the first data.

In some instances, the relational database comprises a plurality of tables. Each table of the plurality of tables represents a unique object and comprises a plurality of rows respectively representing different instances of the unique object, and a plurality of columns respectively representing different attributes of the different instances of the unique object. The plurality of rows and the plurality of columns form a plurality of cells containing object instance data for the different instances of the unique object. The object instance data constitutes at least some of the first data contained in the relational database. A first column of the plurality of columns is a private key column containing unique private keys for respective rows of the plurality of rows in the table. The unique private keys respectively correspond to the different instances of the unique object. The plurality of tables includes at least one parent table, at least one child table, and at least one leaf table. For each child table of the plurality of tables, a second column of the plurality of columns is a foreign key column containing parent private keys also contained in the private key column of a single parent table of the plurality of tables, such that the foreign key column of each child table references only one parent table of the plurality of tables. For the at least one leaf table, none of the private keys in the private key column of the at least one leaf table appears in the foreign key column of any child table in the relational database, such that no parent table of the plurality of tables is the at least one leaf table.

In some instances, A) comprises formatting each table of the plurality of tables as a corresponding separate file that includes table metadata specifying, for each column of the plurality of columns of the table, a data type for the object instance data in the column. In some cases, the data type for the object instance data in the column is one of: a numerical value type, a category type, a time and/or date type, an identifier type for a private key, or a parent private key and the single parent table containing the parent private key, and a text type.

In some instances, formatting each table of the plurality of tables as a corresponding separate file comprises—for each column of the table that includes at least one missing value for the object instance data, including in the corresponding separate file: the column of the table that includes the at least one missing value. The at least one missing value is filled-in by randomly choosing one non-missing value in the column. And, an additional column. The data type for the additional column is the category type. The additional column includes a first indication for each non-missing value in the column and a second indication for each missing value in the column.

Formatting each table of the plurality of tables as a corresponding separate file additionally comprises—for each column of the table having the category type or the time and/or date type for the data type: converting each object instance data in the column from the category type or the time and/or date type to the numerical type, thereby generating converted object instance data of the numerical type, and including in the corresponding separate file a replacement column for the column. The replacement column includes the converted object instance data of the numerical type.

In some instances, the column has the category type for the data type. The object instance data for the column includes a plurality of categories. And, converting each object instance data in the column from the category type to the numerical type comprises: determining a cumulative probability for each category of the plurality of categories, splitting an interval between zero and one into a plurality of sections based on the cumulative probability for each category of the plurality of categories, assigning each section of the plurality of sections to a one category of the plurality of categories based on a corresponding cumulative probability for the one category, converting the object instance data having the one category by selecting a value in the corresponding assigned section, and assigning the selected value as the converted object instance data of the numerical type. In some cases, selecting a value in the corresponding assigned section comprises sampling from a truncated Gaussian distribution having a mean at a center of the corresponding assigned section.

In some instances, the column has the time and/or date type for the data type. The object instance data for the column includes a plurality of times and/or dates. And, converting each object instance data in the column from the time and/or date type to the numerical type comprises converting each time and/or date of the plurality of times and/or dates to a number of seconds before or after a predetermined reference time.

In some instances, A) comprises—for each table of the plurality of tables, electronically generating a descriptive statistical model of the table by: A1) calculating respective column probability distributions for at least some of the columns of the plurality of columns based on the object instance data contained in the at least some of the columns, A2) calculating a plurality of covariances for the respective column probability distributions calculated in A1), and A3) storing in the computer memory representative parameters for the respective column probability distributions and the plurality of covariances as the descriptive statistical model for the table.

In some cases in A1), each column probability distribution of the respective column probability distributions is one of: a Gaussian distribution, a truncated Gaussian distribution, a uniform distribution, a beta distribution, and an exponential distribution. The representative parameters include a first mean, a first variance, and a first indicator for the Gaussian distribution. The representative parameters include a second mean, a second variance, a first minimum value, a first maximum value, and a second indicator for the truncated Gaussian distribution. The representative parameters include a second minimum value, a second maximum value, and a third indicator for the uniform distribution. The representative parameters include an alpha parameter, a beta parameter, and a fourth indicator for the beta distribution. The representative parameters include a decay parameter and a fifth indicator for the exponential distribution.

In some cases, A2) comprises: A2a) applying a Gaussian Copula process to each column probability distribution of the respective column probability distributions to convert the respective column probability distributions to respective standard normal distributions, and A2b) calculating the plurality of covariances for the respective column probability distributions based on the respective standard normal distributions in A2a). In some cases, B) comprises: for at least one parent table of the plurality of tables that is not a child table, synthesizing anonymized row data for at least one row of the at least one parent table based on the descriptive statistical model for the at least one parent table.

In some instances, for each parent table of the plurality of tables, A) further comprises, prior to A1): A-2) adding to the parent table a plurality of derived columns so as to generate an extended parent table including a plurality of extended rows, and A-1) calculating representative statistics for all child tables of the plurality of tables that reference the parent table, and placing the calculated representative statistics in the plurality of derived columns of the extended parent table. Each extended row of the extended parent table contains duplicate object instance data from the plurality of columns of the parent table. In some instances, A) further comprises, prior to A1): determining a first parent table of the plurality of tables for which each child table that references the first parent table is a leaf table, performing A-2) and A-1) on the first parent table to generate an extended first parent table, and subsequently performing A-2) and A-1) on a second parent table of the plurality of tables. The extended first parent table is a first child table that references the second parent table.

In some instances, A-1) comprises—for each row of the parent table: 1) determining a first number m of child tables of the plurality of tables containing a parent private key in the foreign key columns of the m child tables that matches the unique private key in the private key column of the parent table for the row of the parent table. 2) for each child table of the m child tables: 2a) determining all matching child rows in the child table containing the parent private key that matches the unique private key for the row of the parent table, and 2b) creating a conditional data table including the matching child rows. 3) for each conditional data table corresponding to one of them child tables, generating a set of conditional parameters by: 3a) calculating respective column probability distributions for at least some of the columns in the conditional data table based on the object instance data present in the at least some of the columns, and 3b) calculating a plurality of covariances for the respective column probability distributions calculated in 3a). 4) for each set of conditional parameters corresponding to one of the m child tables, placing the set of conditional parameters in at least some of the plurality of derived columns of an extended row of the extended parent table that corresponds to the row of the parent table. And, 5) placing a second number n, representing a total of all matching child rows in all of the m child tables, in at least one of the plurality of derived columns of the extended row of the extended parent table.

In some instances, in A-1) 3a), each column probability distribution of the respective column probability distributions for the at least some of the columns in the conditional data table is one of: a Gaussian distribution, a truncated Gaussian distribution, a uniform distribution, a beta distribution, and an exponential distribution. The set of conditional parameters includes a first mean, a first variance, and a first indicator for the Gaussian distribution. The set of conditional parameters includes a second mean, a second variance, a first minimum value, a first maximum value, and a second indicator for the truncated Gaussian distribution. The set of conditional parameters includes a second minimum value, a second maximum value, and a third indicator for the uniform distribution. The set of conditional parameters includes an alpha parameter, a beta parameter, and a fourth indicator for the beta distribution. The set of conditional parameters includes a decay parameter and a fifth indicator for the exponential distribution.

In some instances, A-1) 3b) comprises: applying a Gaussian Copula process to each column probability distribution of the respective column probability distributions to convert the respective column probability distributions to respective standard normal distributions, and calculating the plurality of covariances for the respective column probability distributions based on the respective standard normal distributions.

In some instances, A) further comprises, prior to A1), storing in memory each extended parent table. For each extended parent table—A1) comprises calculating respective column probability distributions for: at least some of the columns of the plurality of columns based on the object instance data contained in the at least some of the columns, and the plurality of derived columns based on the conditional parameters and the second numbers n contained in the plurality of derived columns. A2) comprises calculating the plurality of covariances for the respective column probability distributions calculated in A1). And, A3) storing in the computer memory the representative parameters for the respective column probability distributions and the plurality of covariances as the descriptive statistical model for the extended parent table.

In some instances, in A1), each column probability distribution of the respective column probability distributions is one of: a Gaussian distribution, a truncated Gaussian distribution, a uniform distribution, a beta distribution, and an exponential distribution. The representative parameters include a first mean, a first variance, and a first indicator for the Gaussian distribution. The representative parameters include a second mean, a second variance, a first minimum value, a first maximum value, and a second indicator for the truncated Gaussian distribution. The representative parameters include a second minimum value, a second maximum value, and a third indicator for the uniform distribution. The representative parameters include an alpha parameter, a beta parameter, and a fourth indicator for the beta distribution. The representative parameters include a decay parameter and a fifth indicator for the exponential distribution.

In some instances, A2) comprises: A2a) applying a Gaussian Copula process to each column probability distribution of the respective column probability distributions to convert the respective column probability distributions to respective standard normal distributions, and A2b) calculating the plurality of covariances for the respective column probability distributions based on the respective standard normal distributions in A2a).

In some instances, B) comprises: for at least one child table of the plurality of tables, synthesizing anonymized row data for at least one row of the at least one child table based on the sets of conditional parameters contained in a first extended row of a first extended parent table identified by a first parent private key in the foreign key column of the at least one child table.

In some cases, B) comprises: for at least one extended parent table that is not a child table, synthesizing anonymized parent row data for at least one extended row of the at least one extended parent table based on the descriptive statistical model for the at least one extended parent table. The anonymized parent row data includes anonymized conditional parameters to synthesize anonymized child row data.

In some cases, B comprises: for the at least one extended parent table that is not a child table, synthesizing anonymized parent row data for each row of the at least one extended parent table based on the descriptive statistical model for the at least one extended parent table so as to generate an anonymized extended parent table including a plurality of synthesized rows. Each synthesized row of the plurality of synthesized rows includes anonymized conditional parameters to synthesize anonymized child row data. And, for each row of the plurality of synthesized rows in the anonymized extended parent table, synthesizing the anonymized child row data based on the anonymized conditional parameters.

In some inventive aspects, a method of generating a statistical model of a relational database containing first data, and synthesizing anonymized data based on the generated statistical model, to mimic at least some of the first data in the relational database and thereby protect the privacy of the first data is disclosed. The relational database comprises a plurality of tables. Each table of the plurality of tables represents a unique object and comprises: a plurality of rows respectively representing different instances of the unique object, and a plurality of columns respectively representing different attributes of the different instances of the unique object. The plurality of rows and the plurality of columns form a plurality of cells containing object instance data for the different instances of the unique object. The object instance data constitutes at least some of the first data contained in the relational database. A first column of the plurality of columns is a private key column containing unique private keys for respective rows of the plurality of rows in the table, the unique private keys respectively corresponding to the different instances of the unique object. The plurality of tables includes at least one parent table, at least one child table, and at least one leaf table. For each child table of the plurality of tables, a second column of the plurality of columns is a foreign key column containing parent private keys also contained in the private key column of a single parent table of the plurality of tables, such that the foreign key column of each child table references only one parent table of the plurality of tables, and for the at least one leaf table, none of the private keys in the private key column of the at least one leaf table appears in the foreign key column of any child table in the relational database, such that no parent table of the plurality of tables is the at least one leaf table. The method comprises: A) for each table of the plurality of tables, electronically generating a descriptive statistical model of the table by: A1) calculating respective column probability distributions for at least some of the columns of the plurality of columns based on the object instance data present in the at least some of the columns, and A2) calculating a plurality of covariances for the respective column probability distributions calculated in A1). And, B) for at least one table of the plurality of tables, synthesizing anonymized row data for at least one row of the at least one table based on one of: B1) the respective column probability distributions and the plurality of covariances for the at least one table, if the at least one table does not include a foreign key column including parent private keys, and B2) if the at least one table does include the foreign key column, conditional parameters contained in a first parent row of a first parent table identified by a first parent private key in the foreign key column of the at least one table. The conditional parameters contained in the first parent row include conditional column probability distributions and conditional covariances calculated from all child rows of the first parent row.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 9 illustrates the result of CPA for the row in FIG. 8, in accordance with some inventive aspects.

DETAILED DESCRIPTION

Following below are more detailed descriptions of various concepts related to, and embodiments of, inventive methods apparatus and systems for transforming and statistically modeling relational databases to synthesize privacy-protected anonymized data. It should be appreciated that various concepts introduced above and discussed in greater detail below may be implemented in multiple instantiations. Examples of specific implementations and applications are provided herein primarily for illustrative purposes.

As noted above, organizations are using data to solve predictive problems essential for business—however, some challenges relating to data use and analysis include not having enough of data, and/or having secure/private data that should not be freely disseminated (otherwise exposing security and privacy risks). New and traditional machine learning assume a large number of data points that would come with a large userbase. A generative model of a small database is useful for such organizations because they can use the model to create synthetic data in bulk. Companies can use the synthetic data for: 1) Performance testing with large amounts of data. With a synthetic data model, they can sample as many datapoints as they want, scaling the data size to many Terabytes, and then evaluate the performance of their algorithm on it. 2) Testing software internally. When developing software and debugging, developers who wish to have a sample dataset on their local machine or in their workflow can have synthetic data instead of real data. Furthermore, the synthetic data integrates well with existing applications because it follows the same format as the original. 3) Releasing portions of data for marketing outreach. For example, when companies want to share an open source software and demonstrate it on data, they can release the synthetic data instead of real data. The synthetic data follows the same mathematical properties as the original, so its analysis remains valid for real data. Furthermore, synthetic data can mimic the properties of the original data while also ensuring that the real data is not leaked. By generating synthetic data, the organization does not have to spend resources deciding which data to share, and how to anonymize it.

Synthetic Data Vault

The systems, methods, and apparatus disclosed herein, referred to generally as a "Synthetic Data Vault" (SDV), provide transformative techniques to model relational databases and synthesize data automatically, such that the synthetic data is virtually indistinguishable from the original data.

Figure 1:
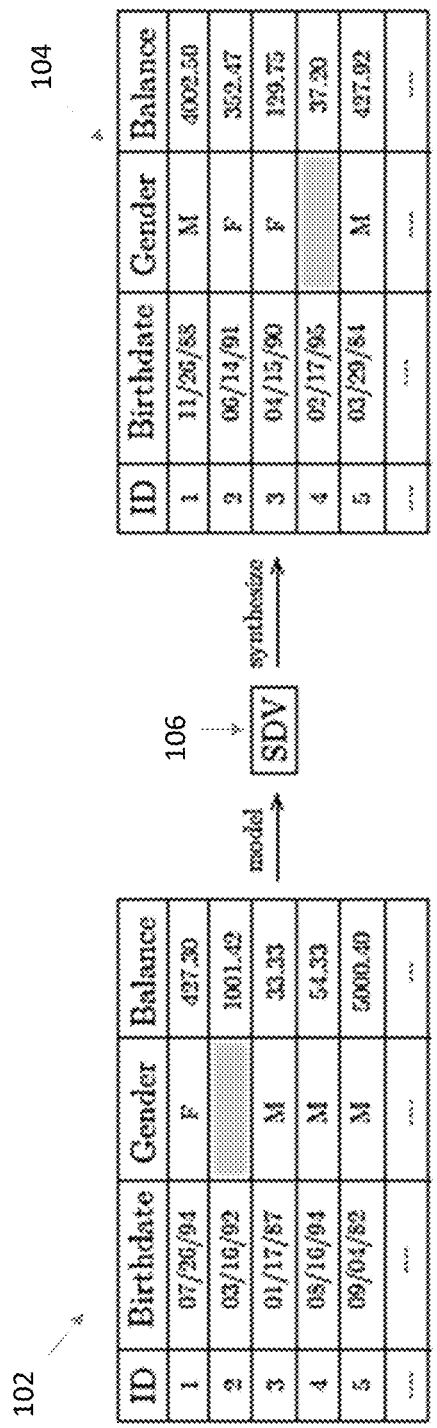
FIG. 1 illustrates an example data sample before it is modeled, and synthetic data that results as an output, in accordance with some inventive aspects.

FIG. 1 illustrates a data sample 102 before it is modeled, and synthetic data 104 that results as an output. The synthetic data 104 has the same mathematical properties as the original data. It has the same ranges, distribution of values, and covariances. The data is presented in the same format, as in datetime column, Birthdate. The SDV 106 even models anomalies, such as some of the genders missing in the original data 102. Based on the SDV techniques illustrated in FIG. 1, an organization can store original customer information internally, and only allow employees with special clearance to view this sensitive data. The synthetic data, however, can be widely disseminated. The company can share it (e.g., on competitions such as Kaggle), use it to run predictive analytics, or display it on their website to advertise its services.

In various implementations, SDV may be characterized by following aspects:

1) Generalizability: The SDV can work on all relational databases without any modifications. It can automate modeling and synthesizing.

2) Usability: The SDV can expose a simple API that allows users to specify an input and then perform synthesis to their specification. It can synthesize data for individual cells, columns, tables, or the entire database.

3) Accuracy: The SDV can synthesize output that can realistically replace the original data.

Overview of SDV Workflow

Figure 2:
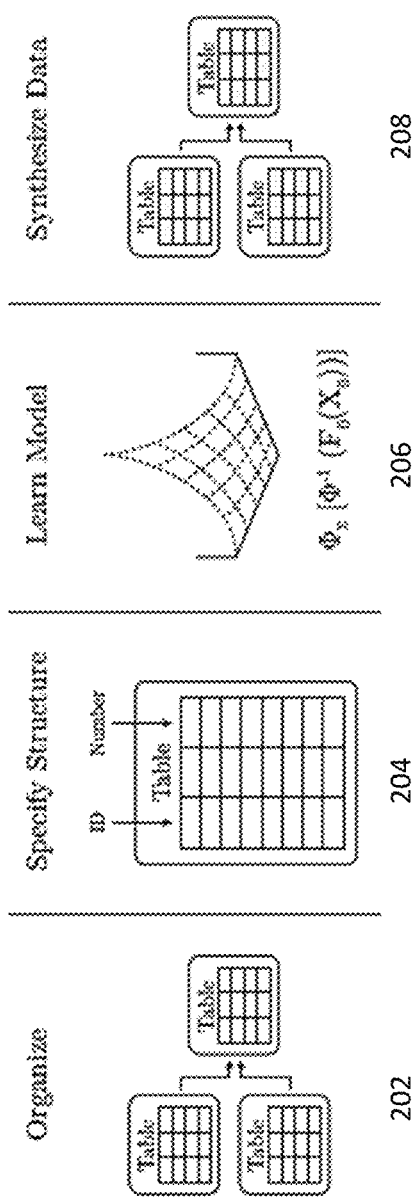
FIG. 2 illustrates the SDV workflow wherein the user collects and formats the data, specifies the structure and data types, runs the modeling system, and then uses the learned model to synthesize new data, in accordance with some inventive aspects.

In one example implementation, SDV involves four general steps, as illustrated in FIG. 2. First at 202, an original relational database is transformed, e.g., restructured, into a format/organization that facilitates generative modeling. Then at 204, structural aspects of the restructured relational database are specified and included in the restructured database itself (e.g., some basic information about the structure of the transformed database is provided to facilitate modeling of the data and interrelationships of respective tables in the database). In 206, the transformed/restructured database is statistically (e.g., generatively) modeled, and in 208 the model may be used to synthesize data that statistically mimics the original data in the database. In one aspect, an applications programming interface (API) is provided to allow synthesized data to be generated with varying granularities.

Organize (Step 202)

In one implementation, the original relational database is formatted as respective separate files, e.g., one file for each table of the database. In one aspect, the transformation/restructuring of the database adopts the following constraints regarding relationships between the tables of the database (relationships and other database terminology is further discussed in subsequent sections): 1) the database should only have many-to-one relationships. While certain databases allow many-to-many relations, these can easily be converted into two many-to-one relations by introducing a new, intermediate table; and 2) the database should not have circular references. That is, if table A relates to B and B relates to C, then C cannot relate back to A. In practice, in some instances, if such references are necessary, the layout of the database is failing to properly capture relations in the data on its own. Thus, it is unreasonable to expect a model to understand the complexities behind the relations as well.

Specify Structure (Step 204)

The transformed/restructured database following the constraints identified above also includes basic information about the structure of each table, which in one example is included in the restructured database as metadata. For example, for each column of data, type type of data needs to be specified. In example implementations, the column data may be specified as one of the following types of five categories:

1. Number: A numerical value, either an integer or decimal.

2. Categorical: Discrete categories. These can be represented as text or numbers.

3. Datetime: Time information, with a specified format.

4. ID: Either identifying information for the table rows, or references to other tables in the database. These could be represented as numerical values or as text.

5. Text: Raw text that should not be modeled. If there is any structure to the text, the user can provide a regex describing it.

Columns with ID information are significant because they contain relationship information between multiple tables. If the ID column of a table references an ID column of another table, the user may specify that table.

In some inventive aspects, the user is asked to supply the meta file since each organization uses different naming conventions for the columns. Furthermore, all SQL databases require a schema, so the information should be readily available to the database administrator. In order to compute the generative model, the SDV accepts a meta file containing all of this information as input.

Learn Model (Step 206)

The user then invokes the SDV's script to learn the generative model. The SDV iterates through tables sequentially, using a modeling algorithm designed to account for the relations between the tables. For each table, the SDV discovers a structure of dependence. If other tables reference the current one, dependence exists, and the SDV computes aggregate statistics for the other tables. The aggregate statistics then get added to the original table, forming an extended table. This extended table is then modeled. It captures the generating information for the original table columns, as well as all the dependencies between tables. In some inventive aspects, the SDV uses some optimizations to improve efficiency. It saves all the extended tables and model information to external files, so that subsequent invocations for the same database do not unnecessarily perform the same computations.

Synthesize Data (Step 208)

After instantiating the SDV for a database, the user is exposed to an API with three main functions:

1. database.get_table
2. table.synth_row
3. table.synth_children

The first returns a model for a particular table in the database. Once the table has been found, the user can perform the other two functions using it. The synth_row function both synthesizes rows and infers missing data. If the function is called without any arguments, it synthesizes a complete row. Optionally, the user can specify particular values for any subset of columns. When this happens, the synth_row function performs inference and returns the complete row with the missing values filled in. The synth_children function synthesizes complete tables that reference the current table. By applying this function iteratively on the newly-synthesized tables, the user can synthesize an entire database.

The results of both synth_row and synth_children match the original data exactly. The SDV takes steps to delete extended data, round values, and generate random text for textual columns. The result leads to rows and tables containing fully synthesized data that can be used in place of the original.

Concepts and Terminology

Methods, systems, and apparatus of building generative models for relational databases involve an innovative synthesis of various concepts from databases and statistical analysis. The following sections outline some salient concepts and terminology germane to both of these fields to facilitate an understanding of the inventive concepts disclosed herein.

Databases

Databases store large amounts of information in the form of tables. A single table represents a particular set of objects, such as pets, web access logs, or stores. It is arranged such that every column represents an attribute of the object (name, age, timestamp, etc.), which means that data in a column is of the same type. Every row represents an instance of the object. In order to distinguish particular instances, there is usually a column that acts as a reference ID. This column is known as the primary key of the table; each instance has a unique primary key ID.

In a relational database, there are multiple tables representing different collections of objects. The database is relational because the objects may be connected to each other. For example, many pets could belong to the same store. In order to express this relation, some have columns containing a primary key ID of another table. In this example, the pets could have a column that refers to the store ID. Such a column is called a foreign key. Foreign keys in a table don't have to be unique; many pets could refer to the same store. The mapping is inherently a many-to-one relationship. If the foreign keys are also unique, this becomes a one-to-one relationship.

Figure 3:
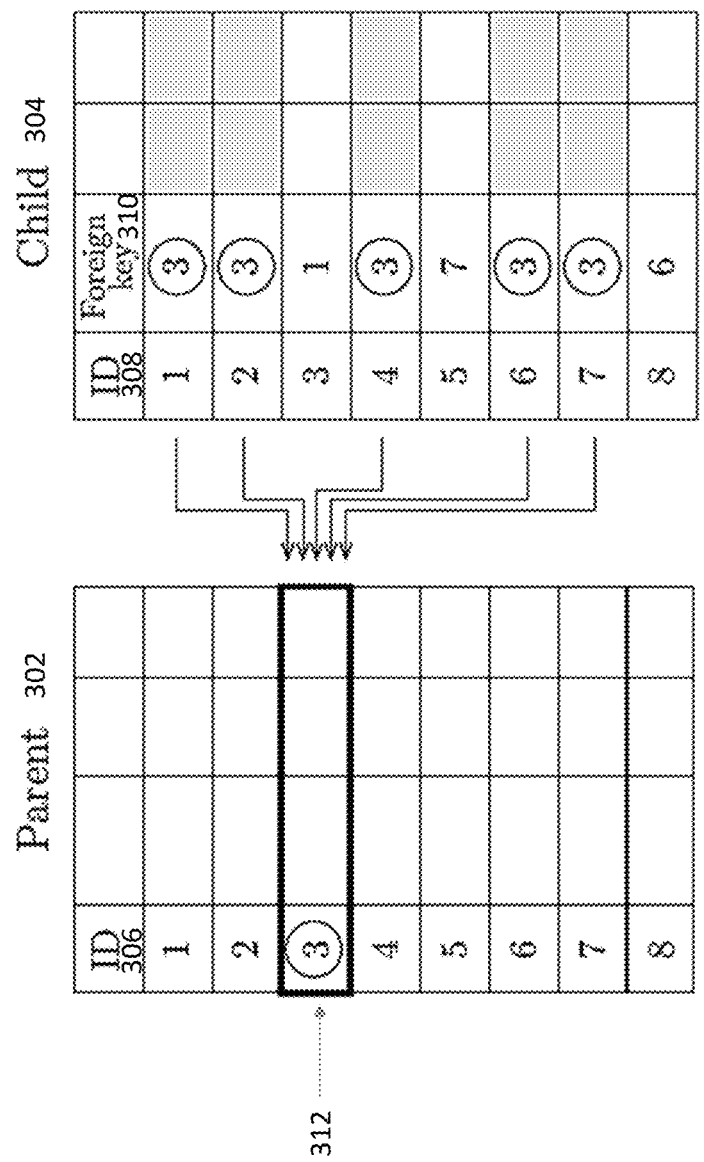
FIG. 3 illustrates a relationship between parent and child rows based on key references, in accordance with some inventive aspects.

In a table relation, the table with the primary key is the parent table, while the table with the foreign key references is the child table. The names capture the notion that multiple rows in a child table can reference the same row in the parent table. FIG. 3 summarizes this information. As shown in FIG. 3, the parent 302 and child 304 rows are based on key references. The parent's 302 first column 306 contains its primary keys, one of which is "3." The child's 304 second column 310 contains references to the parent. The ones that have "3" are referring to the same parent row 312. The process of finding all the child rows that reference a parent is called a conditional primary key lookup.

In one implementation, the conditional primary key lookup can help define the relationship between two tables (e.g., which table is parent table and which is the child). A table may be a parent in one relation, and a child in another relation. In this disclosure, a table is called a leaf table if it is never a parent in any of its relations.

Statistics

Statistics involves lists of numerical values that represent different measurements of the same phenomenon, such as a person's age, or height. This measurement is known as a random variable, because it can take on different values. However, some values may be more or less frequent than others. The distribution of the random variable assigns a probability to each possible value of a measurement trial.

It is possible to encode the probability distribution of a random variable using a cumulative distribution function (cdf). This function accepts an input x that describes a single measurement trial, and returns u, the percentile rank of the measurement in the overall distribution. Mathematically, u $\in [0,1]$ such that Pr(measurement≤x)=u. If the distribution is d, the cdf is $F_d(x)=u$ and its inverse is $F_d^{-1}(u)=x$.

Figure 4:
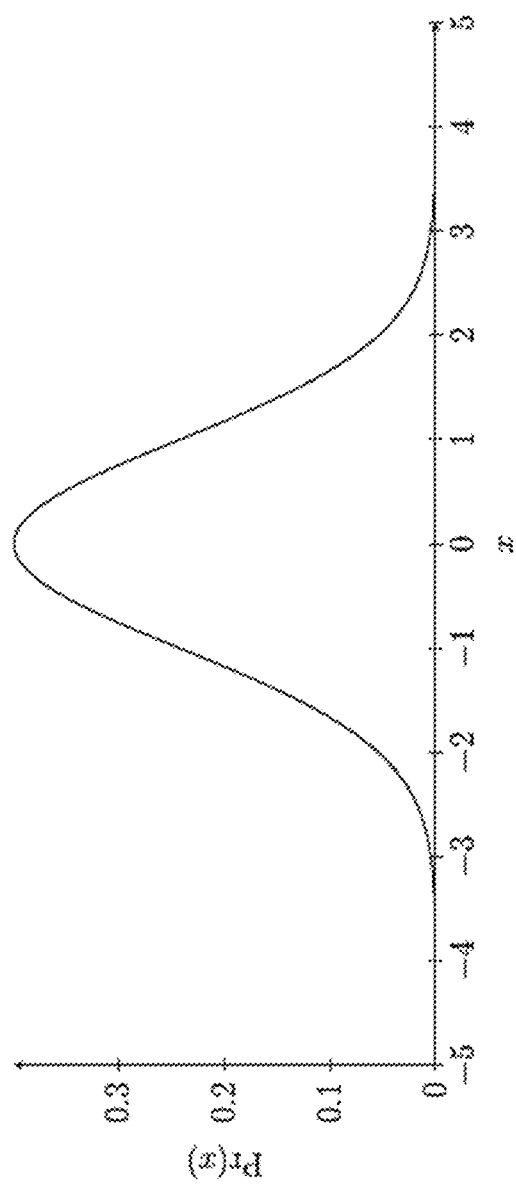
FIG. 4 illustrates the probability frequencies of a standard normal distribution, in accordance with some inventive aspects.

In statistics, there is a special distribution called the Gaussian distribution that is fully described by the mean, $\mu$, and variance, $\sigma^2$. When $\mu=0$ and $\sigma^2=1$, the Gaussian distribution is called a standard normal distribution. FIG. 4 shows a plot of this distribution. The probability of observing value x in a Gaussian distribution is $$Pr(x) = \frac{1}{\sigma\sqrt{2\pi}} e^{\frac{-(x-\mu)^2}{2\sigma^2}}.$$

The standard normal is a special case where mean $\mu=0$ and variance $\sigma^2=1$. A Gaussian distribution's cdf is denoted by $\Phi_{\mu,\sigma^2}(x)$, while a standard normal distribution's cdf is simply $\Phi(x)$.

Figure 5:
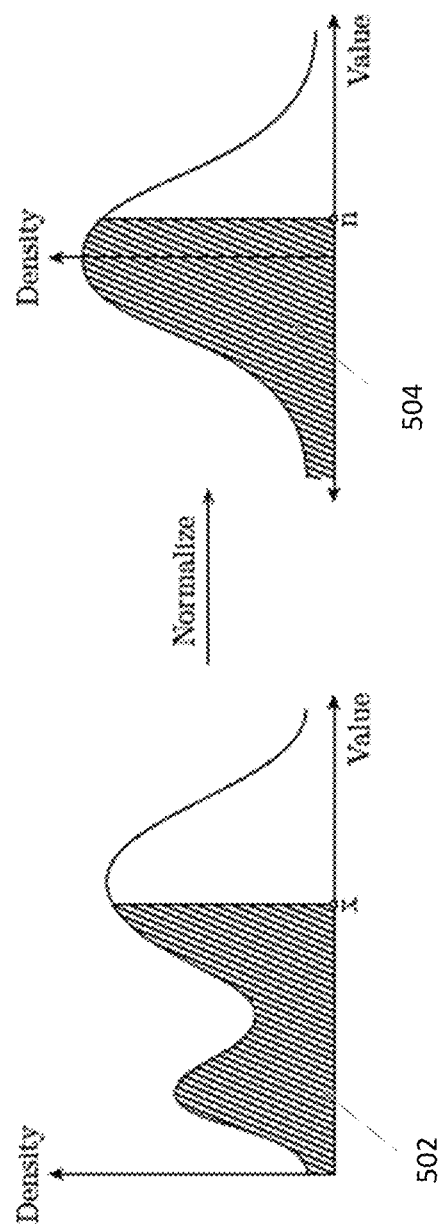
FIG. 5 shows a visual depiction of applying the Gaussian Copula process to normalize an observation by applying $n=\Phi^{-1}(F(x))$, in accordance with some inventive aspects.

Sometimes, a distribution of a random variable may be in a complex or undesirable shape. It is possible to convert the distribution into the shape of another distribution by applying a mathematical transform. In some inventive aspects, the Gaussian Copula process can be applied, which transforms a value x by applying $n=\Phi^{-1}(F_d(x))$. The result of applying the Gaussian Copula process is a new distribution that looks like the standard normal distribution. FIG. 5 shows a visual depiction of applying the Gaussian Copula process to normalize an observation by applying $n=\Phi^{-1}(F(x))$. Calculating $F(x)$ yields a value $u \in [0,1]$ representing the proportion of shaded area at the left 502. Then $\Phi^{-1}(u)$ yields a value n by matching the shaded area 504 in a Gaussian distribution.

Most real-world problems contain multiple random variables, each with a distribution. The covariance between two distributions measures how values in one distribution are associated with values in another. If a and b are distributions, their covariance is denoted by $\sigma_{ab}=\sigma_{ba}$. A positive covariance means higher values in a tend to yield higher values in b; a negative means the opposite. When there are n distributions, there exist $n^2$ ways to calculate the covariance between two distributions. When each of the covariances are placed in a n×n matrix, the result is a covariance matrix denoted by $\Sigma$.

Connections

Creating a generative model for a database involves performing statistical analysis. In order to do this, some example high level connections between database and statistical concepts are summarized in Table 1 below.

TABLE 1

High-level connecting ideas between the database domain and the statistical domain.

| Database Concept | Statistical Concept |
|---|---|
| Column Data | Random Variables |
| Table Data | Multivariate Distributions |
| Relations | Distribution of Distributions |

Column Data as a Random Variable—A table column can correspond to a particular attribute or measurement of an object, such as height or weight. The values in the column then form a random variable, which allows for application of statistical analysis to the column, like calculating the mean $\mu$, or the cdf function, F. Columns with numbers, datetime, or categorical information can be formulated as a random variables: Numbers are essentially the same as measurements. Datetime information can be converted to a number by expressing it as the number of seconds elapsed since Epoch. Categorical information can be converted to numbers by applying a variety of techniques. Other columns that represent text or ID have no corresponding conversions, and therefore no corresponding analogue to random variables.

Table Data as a Multivariate Distribution—The entire table can contain many columns that represent random variables. If this is the case, this data in each row can be condensed to form a single data point in multidimensional space. The entire table then becomes a collection of such multidimensional points, which is similar to a multivariate random variable. Multivariate random variables have corresponding multivariate distributions. There also exists a corresponding multivariate Gaussian Copula for them.

Relations as a Distribution of Distributions—In a many-to-one relationship, every row in a parent table is referenced by a subset of rows in the child table. Each subset of rows is a distribution that can be described by statistics such as $\mu$. If there are n rows in the parent table, then there are n different subsets of children, and n corresponding statistics. These n statistics can form their own distribution: $d=[\mu_1, \mu_2, \ldots, \mu_n]$. This new distribution, d, contains numerical values that represent other distributions. Essentially, it is a distribution of distributions. The SDV especially makes use of this idea to model the dependencies in data that are induced by foreign key relations.

Generative Modeling Method

Figure 6:
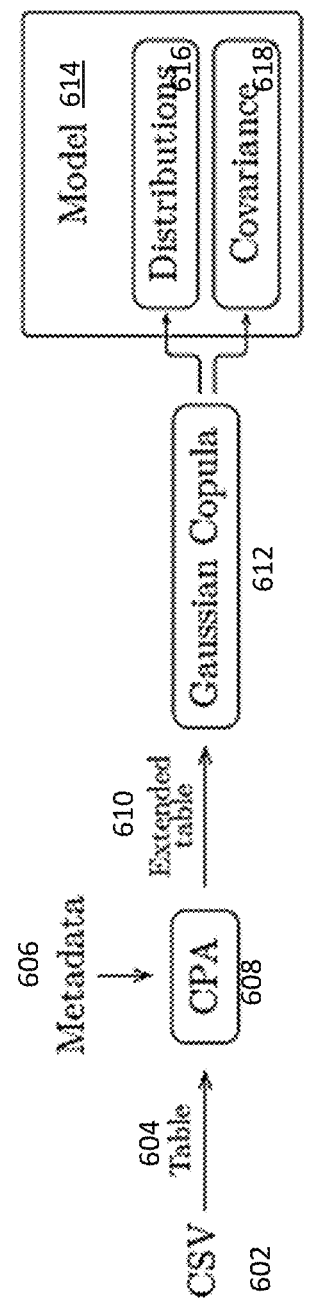
FIG. 6 shows an overview of the generative modeling process, in accordance with some inventive aspects.

This section covers the technical details of the SDV's modeling phase (e.g., step 206 in FIG. 2) in the overall workflow presented in FIG. 2. In some inventive aspects, the generative modeling phase builds a complete model for the entire relational database given meta files and tables. Ultimately, the SDV's database modeling method builds generative models for individual tables. However, it performs extra computations to account for the the relations between the tables using a method called Conditional Parameter Aggregation (CPA). A high-level overview of the generative modeling process is provided by FIG. 6. Conditional Parameter Aggregation 608 accounts for foreign key relations across multiple tables. The Gaussian Copula process 612 calculates the overall table model 614.

The paragraphs below discloses a multivariate generative modeling method that is used for a table, in accordance with some inventive aspects. This modeling method corresponds to the Gaussian Copula process 612 and the model step 614 in FIG. 6.

Standalone Table Model

A standalone table can be defined as a set of rows and columns that is to be modeled independently of any other data. The generative model for a standalone table encompasses all columns that represent numerical data, and it comprises: 1. Distributions: The probability distributions of the values in each column; and 2. Covariances: How the value of a column affects the value of another column in the same row. The distribution describes the values in a column, and the covariance describes their dependence. Together, they form a descriptive model of the entire table.

Distribution

A generative model relies on knowing the distribution shapes of each of its columns. The shape of the distribution is described by the cdf function, F, but in some inventive aspects, this may be expensive to calculate. In some inventive aspects, a method to estimate distribution includes assuming that each F is completely defined by a $\mu$ and $\sigma^2$ value. In other inventive aspects, other common distribution shapes that are parametrized by different values are taken into consideration. For example: 1) Truncated Gaussian Distribution: Parametrized by the mean $\mu$, variance $\sigma^2$, min, and max values; 2) Uniform Distribution: Parametrized by the min and max values; 3) Beta Distribution: Parametrized by $\alpha$ and $\beta$; and 4) Exponential Distribution: Parametrized by the decay $\lambda$.

In some inventive aspects, if the column's data is not Gaussian, it may be better to use a different distribution. In order to test for this fit, the Kolmogorov-Smirnov test can be applied, which returns a p-value representing the likelihood that the data matches a particular distribution. The distribution with the higher p-value is the distribution that can be used to determine the cdf function.

Note that parameters represent different statistics for each distribution. For this reason, the SDV also keeps track of the type of distribution that was used to model each column. This lets the SDV know how to interpret the parameters at a later stage. For example, if the distribution is uniform, then the parameters represent the min and max, but if it's Beta, then they represent α and β.

Covariance

In addition to the distributions, a generative model can also calculate the covariances between the columns. However, in some inventive aspects, the shape of the distributions might unnecessarily influence the covariance estimates. For this reason, a multivariate version of the Gaussian Copula described in the next section can be applied. The Gaussian Copula removes any bias that the distribution shape may induce, by converting all column distributions to standard normal before finding the covariances. Steps to model a Gaussian Copula are:

1. For instance, consider that the columns of a table $0, 1, \ldots, n$, and their respective cumulative distribution functions $F_0, \ldots, F_n$ were given.
2. Go through the table row-by-row. Consider each row as a vector $X=(x_0, x_1, \ldots, x_n)$.
3. Convert the row using the Gaussian Copula: $Y=[\Phi^{-1}(F_0(x_0)), \Phi^{-1}(F_1(x_1)), \ldots, \Phi^{-1}(F_n(x_n))]$ where $\Phi^{-1}(F_i(x_i))$ is the inverse cdf of the Gaussian distribution applied to the cdf of the original distribution.
4. After all the rows are converted, compute the covariance matrix, $\Sigma$ of the transformed values in the table.

Together, the parameters for each column distribution, and the covariance matrix $\Sigma$ becomes the generative model for that table. This model contains all the information from the original table in a compact way, and can be used to synthesize new data for this table.

The paragraphs below describe extending the generative model to encompass multiple tables. This is called Conditional Parameter Aggregation (CPA).

Relational Table Model

Figure 7:
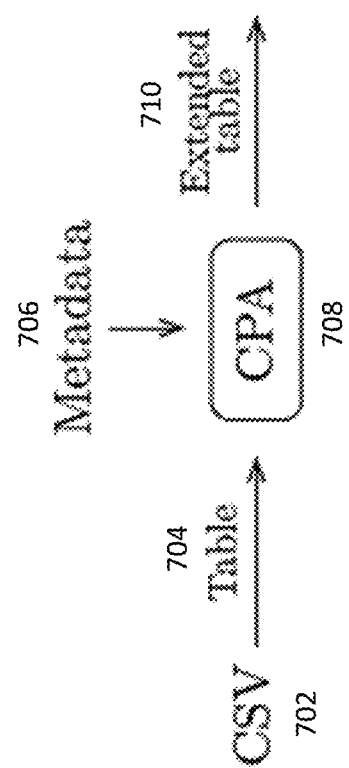
FIG. 7 illustrates the relevant stage of the generative modeling process in FIG. 6, that includes aggregating data from multiple child tables to create an extended table that accounts for the original relations, in accordance with some inventive aspects.

In a relational database, a table may not be standalone if there are other tables in the database that refer to it. Thus, to fully account for the additional influence a table may have on others, its generative model can encompass information from its child tables. To do this, a method called Conditional Parameter Aggregation (CPA) is applied that specifies how its children's information can be incorporated into the table. FIG. 7 illustrates the relevant stage of the generative modeling process in FIG. 6, that includes aggregating data from multiple child tables to create an extended table 710 that accounts for the original relations, in accordance with some inventive aspects.

Figure 8:
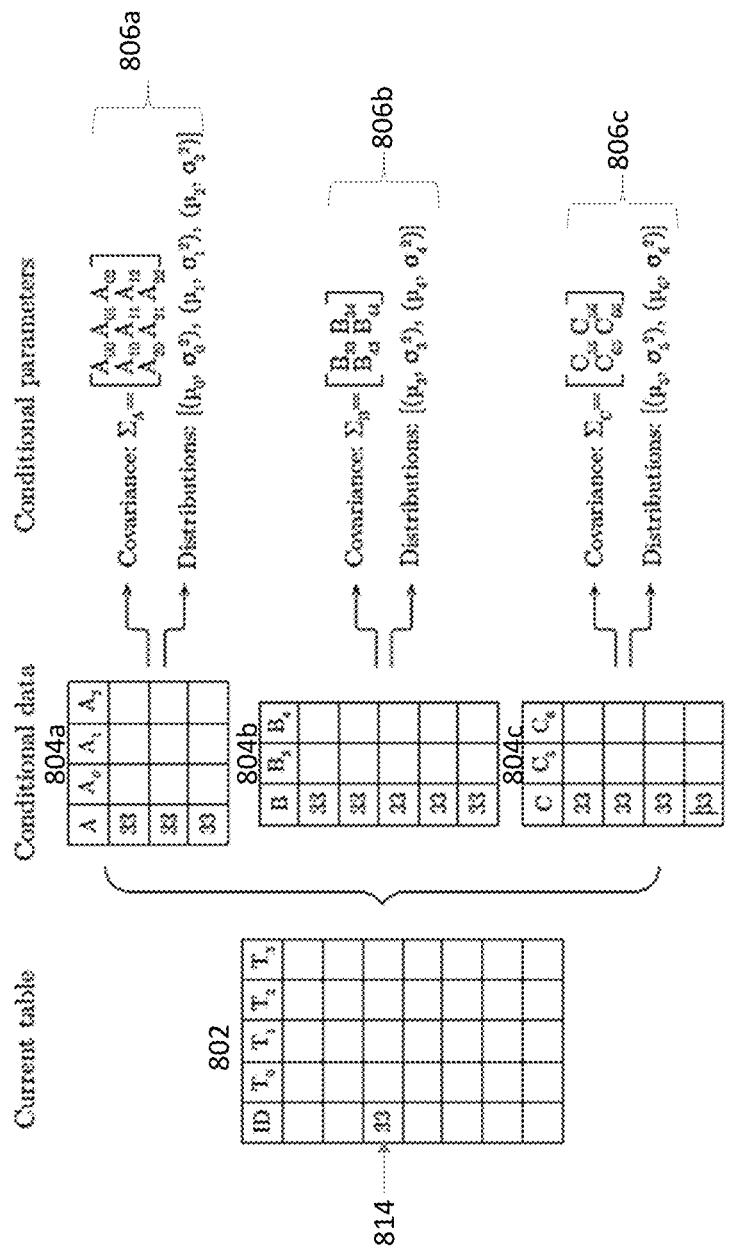
FIG. 8 shows an illustration of CPA for a row in a table, in accordance with some inventive aspects.

The following paragraph explains the CPA method. In some inventive aspects, CPA may only be necessary when the table being processed is not a leaf table. This means there is at least one other table with a column that references rows in the current one. In one example implementation, CPA comprises the following steps:

1). Iterate through each row in the table.
2). Perform a conditional primary key lookup in the entire database using the ID of that row. If there are m different foreign key columns that refer to the current table, then the lookup will yield m sets of rows. Each set is called conditional data. FIG. 8 illustrates such a lookup that identifies m=3 sets of conditional data. FIG. 8 is an illustration of CPA for a row 814 in table 802 with primary key "33." Tables A, B, and C (not shown in FIG. 8) refer to table 802, so the lookup yields three sets of conditional data 804a, 804b, and 804c respectively. Each set of conditional data is modeled using the Gaussian Copula, yielding conditional parameters 806a, 806b, and 806c.

3). For each set of conditional data (e.g., 804a, 804b, and 804c in FIG. 8), perform the Gaussian Copula process. This will yield m sets of distributions, and m sets of covariance matrices, $\Sigma$. These values are called conditional parameters (e.g., 806a, 806b, and 806c in FIG. 8), because they represent parameters of a model for a subset of data from a child, given a parent ID (as seen in FIG. 8).
4). Place the conditional parameters (e.g., 806a, 806b, and 806c in FIG. 8) as additional values for the row in the original table. The new columns are called derived columns, shown in FIG. 9. FIG. 9 illustrates the result of CPA. Every lookup for a row yields a value, such as $\mu_5$ or $B_{43}$. The values form their own columns, resulting in an extended table.
5). Add a new derived column that expresses the total number of children for each parent.

The extended table (e.g., Extended table 910 in FIG. 9) contains both the original and derived columns. It holds the generating information for the children of each row, so it is essentially a table containing original values and the generative models for its children. The SDV writes the extended table as a separate CSV file, so during subsequent invocations of the same database the CPA need not be recalculated.

Subsequently, Gaussian Copula process can be applied to create a generative model of the extended table. This model not only captures the covariances between the original columns, but the dependence of the conditional parameters on the values in the original columns. For example, it includes the covariance between original column $T_0$ (in Table 802 in FIG. 8) and derived column $\mu_5^2$ (in Table 910 in FIG. 9).

The paragraphs below provide additional adjustments necessary to make the algorithms more generalizable.

Pre-Processing

Both Gaussian Copula and CPA assume there are no missing entries in the column, and that the values are numerical. When either of assumptions is false, a pre-processing step can be invoked. This step ultimately converts a column of one data type into one or more columns of another data type, as summarized by Table 2.

TABLE 2

Conversions that can be made when pre-processing. If multiple data types are listed, it means that multiple columns are created from the original column.

| Original Column Type | Replaced Column(s) Type |
| --- | --- |
| Categorical | Number |
| Datetime | Number |
| Number w/Missing Values | Number & Categorical |
| Categorical w/Missing Values | Categorical & Categorical |
| Datetime w/Missing Values | Datetime & Categorical |

Note that some data types might require multiple rounds of pre-processing. For example, a column that is a datetime with missing values is first converted into two columns of type categorical and datetime. Then, those resulting categorical and datetime columns are further converted into number columns.

Missing Values

Missing values in a column cannot simply be ignored because the reasons for which they are missing may reveal some extra information about the data. As an example, consider a table representing people with a column called weight, which is missing for some rows. The reasons for missing data can fall into one of three categories:

1). Missing not at random: The data is missing because of what it's supposed to be. Perhaps people who are overweight chose not to disclose their weight, so knowing that the cell is missing probably means the weight is high.
2). Missing at random: The fact that the item is missing is linked with some other piece of data in that row. For example, perhaps a majority of females did not disclose their weight. So knowing that a person is female makes it more likely that the weight column will be missing.
3). Missing completely at random: The fact that the item is missing tells us nothing about the structure of the rest of the data. For example, the database admin accidentally deleted some of the weights, randomly.

In the first two cases, knowing that the value is missing provides further information about the data itself. Therefore, it is important to model missing values overall. Furthermore, one of the goals of the systems and methods disclosed herein is to model and synthesize data that mimics the format of the original. If the original data has some missing values, these missing values should be synthesized too. Modeling the null values solves this problem. In the final case, it is not imperative that the missing values are considered from a numerical perspective, but the SDV does not know this may be the case. Hence, even though the third case is missing completely at random, in some inventive aspects, the SDV can make a model.

When the SDV encounters any column that has at least one missing value, it replaces the column with two columns:
1) A column of the same type, with missing values filled-in by randomly choosing non-missing values in the same column.
2) A categorical column that contains "Yes" if the original data was present, and "No" if the data was missing for that row.

This solution ensures that the original column contains values for all rows, but also accounts for the fact that some were originally missing.

Categorical

Categorical columns may exist originally in the table, or may be a result pre-processing missing values. In some inventive aspects, categorical data cannot be modeled by the Gaussian Copula or CPA. When the SDV encounters a categorical column, the SDV replaces it with a numerical column containing values in the range [0,1]. To do this, it uses the following method:
1). Sort the categories from most frequently occurring to least.
2). Split the interval [0,1] into sections based on the cumulative probability for each category.
3). To convert a category, find the interval [a, b] ∈[0,1] that corresponds to the category.
4). Chose value between a and b by sampling from a truncated Gaussian distribution with μ at the center of the interval, and $$\sigma = \frac{b-a}{6}.$$

Figure 10:
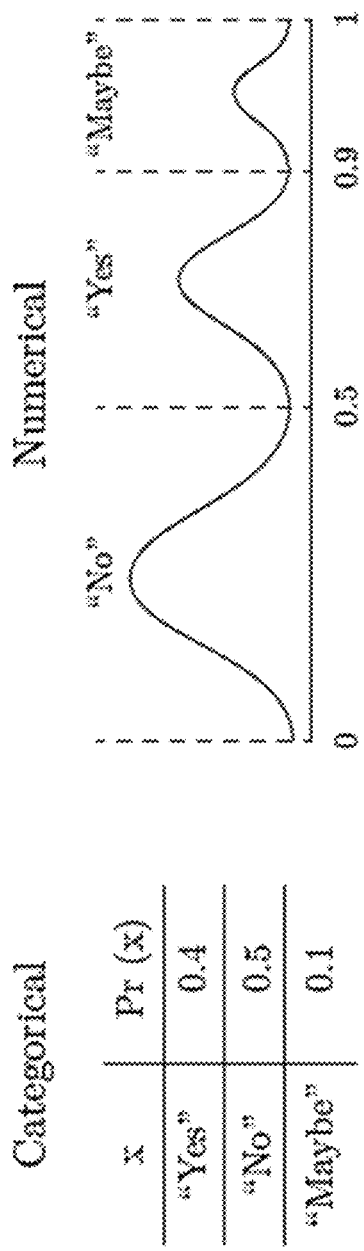
FIG. 10 illustrates the method that converts categorical variables to numerical data, in accordance with some inventive aspects.

FIG. 10 is an illustration of the method that converts categorical variables to numerical data. Based on the proportions, "No" is assigned the interval [0,0.5]; "Yes" is assigned [0.5,0.9], and "Maybe" is assigned [0.9,1]. Each occupies its allocated interval with a Gaussian distribution. Note that while Gaussian distributions are completely defined by μ and $\sigma^2$, the same may not be true for categorical distributions. Instead, categorical distributions may require new parameters representing the proportions of each of the c categories, $p_0, p_1, \ldots, p_c$, with $0 \leq p_i \leq 1$ and $$\sum_i p_i = 1.$$

These are the conditional parameters that are put in the extended table for categorical columns.

Choosing a value using a Gaussian distribution gives dense areas at the center of each interval, but ensures that the numbers are essentially different. The inverse is also easy to compute: Given a value $v \in [0,1]$, the interval that v corresponds to can be found and its category can be returned.

Datetime

Finally, many tables may contain information containing times or dates that is represented as text. The SDV replaces such columns with numerical values, as any timestamp can be expressed as the number of seconds past Epoch (Jan. 1, 1970). If timestamp represents a time before Epoch, then the numerical value is negative (number of seconds until Epoch).

Nomenclature

Both pre-processing and CPA add new columns to the table. A standardized nomenclature for these new columns is necessary for two reasons:
1) No namespace guarantees: From the CPA discussion in FIG. 8, recall the figure displayed child rows in organized sets, A, B, and C, and numbered each column uniquely from $A_0$ to $A_6$. In practice, sets and column names are not always guaranteed to be unique, and a single parent table may even have multiple foreign keys coming from the same table.
2) Usability: Generic names like $A_{00}$ and $\mu_1$ provide no explanation about how the columns were derived from the conditional key lookups, and may be confusing to the users.

Therefore, in some inventive aspects, it may be required that every new column has a unique name, and that every unique name clearly defines the computation that created it.

Definition

The final nomenclature for column names is presented below:

< name >=< derived_name >|< original_name >
< derived_name >=< missing_values >|< CPA >
< missing_values >= ? < name >
< CPA >=< child_table >:< foreign_key > (< value >)
< value >="count"|< name > * < name >|< name > @int |< name > @category Original column names are those that have been defined and inputted by the creator of the database. Derived columns can either be the result of having an original column with missing values, or the result of CPA. For CPA, the prefix is based on the name of the child table and foreign key. These two pieces of information precisely define the conditional primary key lookup that was performed before aggregating the data. The type of aggregation is then described by the value inside the parenthesis. This can be one of four aggregations:
1) "count": The columns represents the number of child rows that were returned by the conditional primary key lookup. All values must be integers.

2) <name>*<name>: This column represents the covariance between two columns.
3) <name>@int: This column represents a distribution parameter for the column. The particular quantity this describes depends on type of distribution. This is not valid for categorical columns.
4) <name>@category: This column represents the probability that a member of the distribution falls into a specific category. This is only valid for categorical columns. All values must fall in the range [0,1].

The nomenclature highlights a recursive nature to the database, as each instance of <name> is replaced by another column that follows the same nomenclature. The recursion ends with the column names that are provided in the original input data. Simply by viewing the column names, it is possible to reverse-engineer the structure of the entire database.

Illustration

The following paragraphs illustrate nomenclature on a sample database. For example, a sample database represents drawn from the foreign key columns to the primary reference. Note that the games table 1104 has two separate foreign keys 1106*b* and 1106*c* that reference the same teams table 1102. In some inventive aspects, the numerical weight column 1108 may contain missing cells.

When the SDV is given the information for this database, it pulls out all primary key, foreign key, and text columns because they do not represent random variables. The remaining data is involved in the CPA and Gaussian Copula process. The SDV models the people 1110 and games 1104 table before modeling the teams, because all children of a table must be processed first. That is, the children of a given parent table are processed before the parent table itself. When it is done, the tables may contain some derived columns based on the possible null values and the CPA step. Table 3 lists all the modeled columns. The nomenclature disclosed herein makes it easy to comprehend the process that was used to calculate the values in each of the columns.

TABLE 3

The original modeled columns and derived columns of each table in the sample database. These are shown in normal text. The bold helps organize the columns by reference (table_name: foreign_key) and by aggregation (distribution, covariance, or count).

Figure 11:
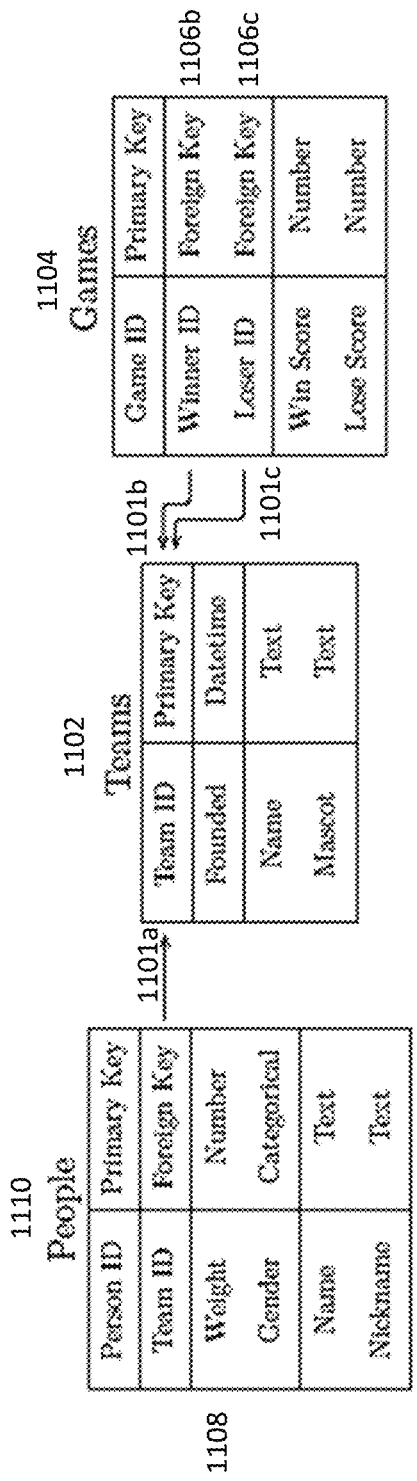
FIG. 11 illustrates the database schema for a sample database, in accordance with some inventive aspects.

| | Orig. | | | Derived |
|---|---|---|---|---|
| games | winScore | | | |
| | loseScore | | | |
| people | weight | | | ?weight |
| | gender | | | |
| teams | founded | people:teamID | dist | people:teamID(gender@MALE) |
| | | | | people:teamID(weight@0) |
| | | | | people:teamID(weight@1) |
| | | | | people:teamID(weight@2) |
| | | | | people:teamID(weight@3) |
| | | | | people:teamID(?weight@YES) |
| | | | cov | people:teamID(gender*gender) |
| | | | | people:teamID(weight*weight) |
| | | | | people:teamID(?weight*?weight) |
| | | | | people:teamID(gender*weight) |
| | | | | people:teamID(gender*?weight) |
| | | | | people:teamID(weight*?weight) |
| | | | count | people:teamID(count) |
| | | games:winnerID | dist | games:winnerID(winScore@0) |
| | | | | games:winnerID(winScore@1) |
| | | | | games:winnerID(loseScore@0) |
| | | | | games:winnerID(loseScore@1) |
| | | | cov | games:winnerID(winScore*winScore) |
| | | | | games:winnerID(loseScore*loseScore) |
| | | | | games:winnerID(winScore*loseScore) |
| | | | count | games:winnerID(count) |
| | | games:loserID | dist | games:loserID(winScore@0) |
| | | | | games:loserID(winScore@1) |
| | | | | games:loserID(loseScore@0) |
| | | | | games:loserID(loseScore@1) |
| | | | cov | games:loserID(winScore*winScore) |
| | | | | games:loserID(loseScore*loseScore) |
| | | | | games:loserID(winScore*loseScore) |
| | | | count | games:loserID(count) | athletes playing games. There are tables representing teams, games, and people. Many people can belong to the same team. A single team can also win or lose many games. FIG. 11 summarizes this information using a visual representation. The teams table 1102 is a parent table with people 1110 and games 1104 as its children. Note that people 1110 and games 1104 do not have any other tables referencing their primary keys (personID and gameID), making them leaf tables. FIG. 11 shows the database schema for the sample database. For example, arrows 1101*a*, 1101*b*, and 1101*c* are In some inventive aspects, categorical variables with c categories only have c−1 categories represented in the derived columns. Therefore, even though the gender of a person may be "Male" or "Female", there is only one column representing the proportions. Similarly, ?weight is a derived categorical column because the original weight column had missing values. The derived column has both "YES" and "NO" entries, but only one of those proportions is necessary to store. Also, the number of parameters in the distribution for different numerical fields may vary. For example, weight has four parameters (weight@0 through weight@3), while winScore and loseScore only have two. This happens because the distribution shape of weight is different from winScore and loseScore. In this particular case, weight may be a truncated normal distribution that needs four parameters for $\mu$, $\sigma^2$, min, and max; the others may be uniform distributions that just require two parameters for min and max.

Finally, observe that the process of CPA can continue to make new columns if the teams table had a foreign key reference called leagueID to parent table that represents leagues (i.e. one league contains many teams). Then the nomenclature would nest the column names of teams as part of CPA. The model would create columns with names such as:

teams:leagueID(people:teamID(gender*?weight)*games:winnerID(count))

The paragraphs below discloses the overall logic for applying the modeling technique. In some inventive aspects, CPA can be applied recursively for all the tables, in order to model the entire database.

Database Modeling

The following paragraph describes the overall system by providing control logic for modeling an entire database. This includes applying CPA recursively to calculate the model of the entire database.

Let D, for example, represent a database comprising multiple tables, T. The relations between the tables are known, so let C(T) represent the set of T's children, and P(T) represent the set of T's parents. Other mathematical functions include the cdf function, F, and the covariance $\Sigma$. The CPA method works across a parent-child relationship. However, the children may have more children, so CPA is applied recursively down all of the parent's descendants. This is called recursive approach Recursive Conditional Parameter Aggregation, or RCPA. Algorithm 1 below provides the logic for RCPA.

---

Algorithm 1 A recursive application of CPA to add derived columns to T.

1: function RCPA(T)
2:   for all C ∈ C(T) do
3:     RCPA(C)
4:   T ← CPA(T)
5:   T ← PREPROCESS(T)

---

Note that the CPA method returns the extended table. Line 4 saves the extended table as T. Finally, line 5 pre-processes T to convert the values into numerical data. The base case of this algorithm is for leaf tables, tables where C(T)=∅. Such tables are guaranteed by the non-circularity constraint.

When the SDV creates the overall model, it applies RCPA and uses the results to calculate the database model. The SDV's modeling algorithm calls the RCPA method on all tables without parents. Because RCPA is recursive, this ensures that all tables in the database ultimately go through the CPA method. Afterwards, it calculates the cdf functions, given by F, as well as the covariances by using the Gaussian Copula for all extended tables. The logic is given in Algorithm 2.

---

Algorithm 2 The overall modeling logic for the SDV for database D.

1: function SDV-MODEL(D)
2:   for all T ∈ D &t. $\mathcal{P}$(T) = ∅ do
3:     RCPA(T)
4:   cdf ← ∅
5:   cov ← ∅
6:   for all T ∈ D do
7:     cdf ← cdf ∪ F(T)
8:     cov ← cov ∪ $\Sigma_{(\Phi-1(F)(T))}$
9:   return cdf, cov

---

The algorithm saves and returns all the cdf and covariances of the tables. The cdf functions are calculated using the table returned by the extend function. The covariance is calculated after applying the Gaussian Copula to that table. Together, the cdf and covariances form the generative model for database D. When this function returns, the user can control the amount and type of data to synthesize.

In summary, the overall database model saves the following for every table:
1) The extended table (calculated by Algorithm 1)
2) The cdfs of columns in the extended table (returned by Algorithm 2)
3) The covariances of columns in the extended table (returned by Algorithm 2)

Data Synthesis

This section discloses the details of the last step in the SDV's workflow (e.g., step 208 in FIG. 2): Synthesizing data based on the calculated database model.

The synthesis can be broken into two categories:
1) Model-Based: The user may wish to synthesize data relying on the model that has been computed. For example, a user may want to synthesize the entire database of their customer information.
2) Knowledge-Based: The user may already has some information about the data, and may wish to synthesize the rest it. For example, the user may want to synthesize information for particular types of customers (female, age 22, etc.).

The SDV can perform both types of synthesis.

Model-Based

Model-based synthesis is based on being able to sample data from the calculated distribution and covariances. The modeling was learned using pre-processed numerical values that represent numbers, datetime, categories, and missing values. Once sampling from the model is performed, the primary key and foreign key relations can be factored in to synthesize tables, and ultimately the entire database.

Sampling Numerical Values

All numerical values can be sampled from the distributions and covariances of the columns. Call the set of cdf functions F, and the covariance matrix $\Sigma$. The method to sample numerical values is given by algorithm 3. Say there are n columns, then $|\Sigma|=|F|=n$.

---

Algorithm 3 Sampling numerical values from distribution and covariances of the columns.

1: function SAMPLE(F, $\Sigma$)
2:   v ← random n-dimensional Guassian vector
3:   Find Cholesky decomposition, $LL^T = \Sigma$
4:   u ← Lv
5:   x ← $[F_0^{-1}(\Phi(u_0)), F_1^{-1}(\Phi(u_1)), ... F_n^{-1}(\Phi(u_n))]$
6:   return x

---

Line 4 of algorithm 3 uncovers a vector, u, in Copula space. Then, line 5 converts it back to the original space by applying the inverse of the Gaussian Copula. The returned vector, x, provides a value for all columns that were converted to numerical data (numbers, categorical, datetime, and missing values).

Once the numerical value is returned, it can be post-processed to form data that looks like the original. This is accomplished by:
1) Converting back from numerical values to datetime or categorical values
2) Removing values for columns that were not originally in the table. This includes all derived columns from CPA.
3) Making values blank if they are supposed to be missing by looking at the binary "Yes" or "No" value that is sampled.

Row Synthesis

Overall row synthesis relies on sampling. Two separate methods can be implemented depending on if the row does or does not have any parents.

To synthesize a row with no parents (and therefore, no foreign key references), the overall cdfs and covariance computed for its table can be used, $T_F$ and $T_\Sigma$. To synthesize a row with a parent, recall that its parent row, p, has conditional parameters that describe the cdfs and covariances for its children, $p_F$ and $p_\Sigma$. These are the values that are used to generate the child. Both methods are shown in Algorithm 4.

Algorithm 4 Making a row based on information in the table T or in the parent row p.

```
1: function MAKEROWFROMTABLE(T)
2:     id ← random unique ID value
3:     x ← SAMPLE(T_F, T_Σ)
4:     return [id, x]
5:
6: function MAKEROWFROMPARENT(p)
7:     id ← random unique ID value
8:     foreign key ← ID of p
9:     x ← SAMPLE(p_F, p_Σ)
10:    return [id, foreign key, x]
```

The first function, MakeRowFromTable expects an extended table T as input. This can be either the original extended table, or a synthetic version of the extended table. The second function MakeRowFromParent expects a single row, p, containing all values from the derived columns as input. Similar to the first function, p can be either an original row or a synthesized row. Note that both returned values require post-processing to look like the original version of the data.

Database Synthesis

Synthesizing the entire database comprises synthesizing multiple rows and child rows recursively. For instance, synthesizing can begin with a table that has no parents, and then MakeRowFromTable can be called to generate rows for that table. Using the rows from that table, children can be created. Recall that each parent row, p, also stores the number of children it contains, $p_n$. This number can be used to call MakeRowFromParent the appropriate number of times. Finally, recursion to synthesize the children of those children until the entire database is synthesized. The logic is shown by Algorithm 5.

Algorithm 5 The overall database synthesis logic for the SDV.

```
1: function SDV-SYNTHESIZE(D)
2:     for all T ∈ D s.t. P(T) = ∅ do
3:         repeat
```

Algorithm 5 The overall database synthesis logic for the SDV.

```
4:             row ← MAKEROWFROMTABLE(T)
5:             MAKECHILDRENROWS(row)
6:         until reached user-defined threshold
7:
8: function MAKECHILDRENROWS(p)
9:     if p has children then
10:        repeat
11:            child ← MAKEROWFROMPARENT(p)
12:            MAKECHILDRENROWS(child)
13:        until reached p_n children
```

In some inventive aspects, the use-cases will be model-based. They will require the user to synthesize the entire database, or a subset of tables in those databases.

Knowledge Based

In this subsection, algorithms for synthesizing data based on prior knowledge are described. For example, if user is synthesizing data for internally testing an application, they may realize that the application needs a balance of values. As a result, the user may decide to synthesize rows for under represented female customers only.

This requires two modifications from the model-based method. First, the sampling method from Algorithm 3 no longer works because some of the values included in F and Σ have already been observed. This requires a special update to be performed to uncover a new F' and Σ' for just the unobserved data. Second, it requires inference of what the parent might be based on the value that the user provides.

Sampling Updates

If some values are already observed and inputted by the user, then original sampling will not work by itself, because it will return synthesized values for all columns. To account for observed data, it is necessary to update update the Σ matrix, as well as the mean vector μ. Initially, μ=0 due to the Gaussian Copula process.

Let k represent all the observed (known) variables, and u represent the unobserved (unknown) variables the user wishes to synthesize. Then the Σ matrix and μ vector can be rearranged to bring all the unknown variables to the top:

$$\Sigma = \begin{bmatrix} \Sigma_{uu} & \Sigma_{uk} \\ \Sigma_{ku} & \Sigma_{kk} \end{bmatrix}$$

$$\mu = \begin{bmatrix} \mu_u \\ \mu_k \end{bmatrix} = \begin{bmatrix} 0 \\ 0 \end{bmatrix}$$

With this configuration, the SDV can update Σ and μ with the known observations to get a new Σ' and μ' for just the unknown.

$$\Sigma' = \Sigma_{uu} - \Sigma_{uk}\Sigma_{kk}^{-1}\Sigma_{ku}$$

$$\mu' = \mu_u + \Sigma_{uk}\Sigma_{kk}^{-1}(obs - \mu_k) = \Sigma_{uk}\Sigma_{kk}^{-1}obs$$

Where obs is the user-inputted vector containing the known values. Note that the Σ' matrix has dimensions |u|×|u| and the μ' matrix has exactly |u| elements. This is because they only describe the relations for the columns with unobserved values.

Now, the SDV knows the new Σ' and μ', along with the corresponding cdf functions for the unknown variables $F_i, i \in u$. These new values can be used in the sampling algorithm (Algorithm 3) with a slight modification: For instance, in step 4, μ can be added to the vector u. This will return all the values in the row that contain numerical information, some of which is post-processed back into categorical or datetime information. However, in some inventive aspects, it does not include foreign key information, which is why inference can be performed to find the parent.

Parent Inference

If the user has observed certain values for a row and the row has parents, then in some inventive aspects, it can be necessary to infer what the parent row may be.

Recall that each parent row, p contains conditional parameters that describe the covariances, $p_\Sigma$, and cdfs, $p_F$, of its children, so the problem of picking a foreign key simplifies into a log likelihood estimate. For the given data, x, the probability of x belonging to some parent p depends on $p_\Sigma$ and $p_F$. This, in turn, is described by the Gaussian Copula:

$$-\log(L_p(x)) = -\log \Phi_{p_\Sigma}[\Phi^{-1}(p_{F_0}(x_0)), \Phi^{-1}(p_{F_1}(x_1)), \ldots, \Phi^{-1}(p_{F_n}(x_n))]$$

The SDV chooses a parent row of x from a weighted distribution of $-\log(L_p(x))$, $\forall p$. The foreign key of x is the primary key of parent p. Note that the value $\Phi^{-1}(p_{F_i}(x_i)) = \pm\infty$ if $p_{F_i}(x) = 1$ or $0$, making the overall log likelihood approach 0. This happens when the child's data is out of bounds for a parent. For example, if the conditional parameters in p define min and max and the observed row is not in the interval, then p is not a good candidate for a parent.

The overall SDV is able to perform many types of synthesis and inference based on a combination of all the algorithms presented in this section. Given any set of parent or children rows and columns, the SDV can ultimately synthesize the missing values and return them to the user in the same format as the original table.

API Endpoints

When the SDV is ready for the synthesis stage, it provides the user with a database object, from which the user can access individual tables with database.get_table(name). The table object is used for the synthesis. In this disclosure, the model-based and knowledge-based synthesis have been packed in two synthesis endpoints. The first is table.synth_row, that allows the user to synthesize a full row based on the table or its parent rows, while also performing updates based on observed values. The second is table.synth_children, that allows the user to generate all children based on a parent table. This method is a convenient packaging of the MakeRowFromParent algorithm that allows the user to easily synthesize full tables and databases.

table.synth_row

If they are synthesizing a full row, the user can call the synth_row function without any arguments. This generates all of the modeled data. The SDV generates a unique primary key, as well as any textual data that is not modeled. As a final step, the SDV formats the data to mimic the original. This means performing the following checks and transformations:

1) If the column <x> has a corresponding categorical column ?<x> check its value. If ?<x>="NO" then the value should be missing. Set the value of <x> to null.
2) Remove all columns that were not in the original table.
3) If the original column was a datetime, take the numerical value and convert it back to a datetime with a user-provided time regex.
4) If the original column was a category, perform the transform from the disclosure under Categorical in the previous section in reverse to recover the correct category.

As keyword arguments, the user can input any observed values for columns that exist in the table. The SDV performs the appropriate inference to synthesize a full row based on the input. These can include derived columns too, because derived columns are modeled by the SDV. Table 4 shows some examples.

TABLE 4

Example commands using the synth_row function to create new stores. Original columns and derived columns can be inputs to the system.

| Command | English Description |
| --- | --- |
| customer.synth_row( ) | Synthesize a completely new customer |
| customer.synth_row(gender = F) | Synthesize a female customer |
| customer.synth_row(?weight = No) | Synthesize customer with missing weight | table.synth_children

When calling the synth_children function, the SDV synthesize entire tables that represent children of the current table. The number of children generated for each unique primary key of the table are based on the value of the derived count column.

This function completely generates the all the columns of the children table, including any other foreign key constraints that the children may have. This function is intended to help the user generate entirely new databases. The user first calls synth_row on every row in the parent table, and the synth_children recursively until the entire database is synthesized.

Thus, the usability dimension for the SDV is accomplished. An interface is provided for the user giving them control to synthesize data at any granularity. The cell and row granularities are covered by the synth_row method, while the table and database granularities are covered by synth_children.

Experiments

This section discloses experiments that were conducted to validate the SDV's ability to synthesize realistic data. The experiments in this section evaluate the SDV based on the challenges relating to data use and analysis described in the previous sections.

The following paragraphs discuss a subjective approach to understanding what the SDV is capable of understanding when populating a sample database.

There is generally a difference in data quality between internal datasets from industry, and published datasets for data science competitions. Therefore, a real data source is important to accurately observe how the SDV performs with the added complexity of a real-world system. In one inventive aspect, a real-world dataset that was used to analyze the SDV. The paragraphs below first describe the dataset in detail, and then the method that was used to synthesize the data. Finally, some observations from modeling the dataset are described.

Dataset

The dataset related to human resources information, and described the career goals and reviews for 1818 employees. It also contained some information about the employees' quarterly reviews. There were 10 interconnected tables describing this information.

Table 5 provides some metadata about the tables, rows, columns, and relations. This dataset contained more relations and interconnected tables than any publicly available relational dataset.

TABLE 5

Summary statistics for each of the 10 tables in the HR dataset.

| Table | # Rows | # Columns | # Child Tables | # Parent Tables |
|---|---|---|---|---|
| Employees | 1818 | 206 | 4 | 0 |
| Role | 361 | 8 | 0 | 1 |
| Promotions | 24 | 28 | 0 | 1 |
| Performance | 1816 | 27 | 0 | 2 |
| Assessments | 9269 | 130 | 2 | 3 |
| Assessment Details | 4848 | 26 | 0 | 3 |
| Questions | 120 | 9 | 3 | 0 |
| Question Details | 10488 | 37 | 1 | 1 |
| Objectives | 1907 | 97 | 2 | 1 |
| Objective Details | 2193 | 27 | 1 | 1 |

Method

The ultimate goal was to use the SDV to synthesize data for each of the tables, such that the synthesized tables could be used for an organization's internal applications. One particular application was used by supervisors to manage their subordinates' status. The synthesized data could be plugged-in as the back-end for this application, and then the application could be run using real-life scenarios:

1. Querying employee information
2. Querying employee objectives
3. Adding and updating objectives
4. Querying a subordinate's data by a supervisor
5. Adding and updating a subordinate's data by a supervisor Results The synthesized data, provided as CSV files, was easily imported into a database system of an HR organization. The SDV was able to synthesize primary keys and accurately connect rows of different tables using them. Some observations relating to the synthesized data related to hard constraints and self relations.

Hard Constraints: Hard constraints are logical constraints that hold true for every row or column in a table. An example of this are columns that contain begin and end dates of performance reviews for every user. It is generally assumed that the end date will be after the start date.

From running the synthesized data, it was observed that some hard constraints did not hold for about 5% of all rows. The particular constraints were:

Datetime value comparisons. The period begin date must be before the period end date. The date of the review must be between the begin and end date.

Missing value based on orderings. Supervisors must first submit their appraisals in a particular order: objectives, assessments, feedback, and then the summary for each subordinate. Thus, if assessment is missing (hasn't been completed), then the feedback and final summary must be missing too. If the feedback is missing, then the final summary must be missing.

Exact number of foreign key references. Employees must have exactly 1 performance review per supervisor for the quarter.

It was observed in some examples that rows of synthesized data initially broke these constraints due to the probabilistic nature of the synthesizing technique. For example, the SDV correctly identifies a positive covariance between a missing feedback cell and a missing final summary cell. However, it treats that covariance as a probabilistically high likelihood of the two values being missing together. When synthesizing many rows, a few of those rows may represent an unlikely scenario. To automatically fix the issue of hard constraints, in one inventive aspect logical checks can be performed on every subset of columns, and hard constraints can be considered when the check holds for every row.

Self Relations: The second category of problem occurred when the SDV was synthesizing new employees. In addition to an employee ID, there were two additional columns that contained information about the employee's career counselor and direct supervisor. The career counselor and supervisor were also employees, so the employees table had, in effect, a relation to itself. In addition, the supervisor and career counselor had some more non-circularity constraints: If person A was the supervisor of person B, then B could not also be the supervisor of A.

A solution to this would be to create a new table whose purpose is to connect the columns of other tables. Note that a self-relation is a type of circular key dependence that the SDV assumes does not exist in the database.

Overall, the SDV correctly synthesized most data successfully for the use case of test data creation.

The following paragraphs describe a crowdsourcing experiment designed to validate the SDV's ability to synthesize data for the purposes of anonymization.

Scaling Data Science Efforts

The overall goal was to test a data scientist's ability to work with datasets that were synthesized. These experiments were to identify if data scientists could work with synthesized data as easily as the original data.

In order to test this, publicly available relational datasets with prediction problems for a particular column were found. For each dataset, the following steps were performed:

1. Run the SDV on the dataset to create the generative model.
2. Use the model to synthesize data with varying degrees of noise.
3. Hire data scientists to solve prediction problem with a particular version of the dataset (synthesized or the original).

This subsection describes the experiment process. First, details about the datasets are provided, and the method used to synthesize the data is disclosed. Second, the experimental setup with four conditions have been described. Finally, preliminary results are discussed.

Datasets

A total of five relational datasets to use for the experiment were found. Two came from an online relational dataset repository, and three from came from Kaggle™ (https://www.kaggle.com). Table 6 provides a summary of each dataset. The prediction problems for each of the datasets was turned into a classification problem by discretizing the target column's values, if they weren't originally categorical.

TABLE 6

Summaries of the five relational datasets used for the crowdsourcing experiment. The final column refers to the number of classes that the prediction problem encompasses.

| Dataset Name | Source | # Tables | # Classes |
|---|---|---|---|
| Biodegradability | Relational Repo | 5 | 5 |
| Mutagenesis | Relational Repo | 3 | 2 |
| Airbnb | Kaggle | 4 | 12 |
| Rossmann | Kaggle | 2 | 8 |
| Telstra | Kaggle | 5 | 3 |

The rest of this subsection provides schemas and prediction problems for each of the datasets.

Biodegradability

Figure 12:
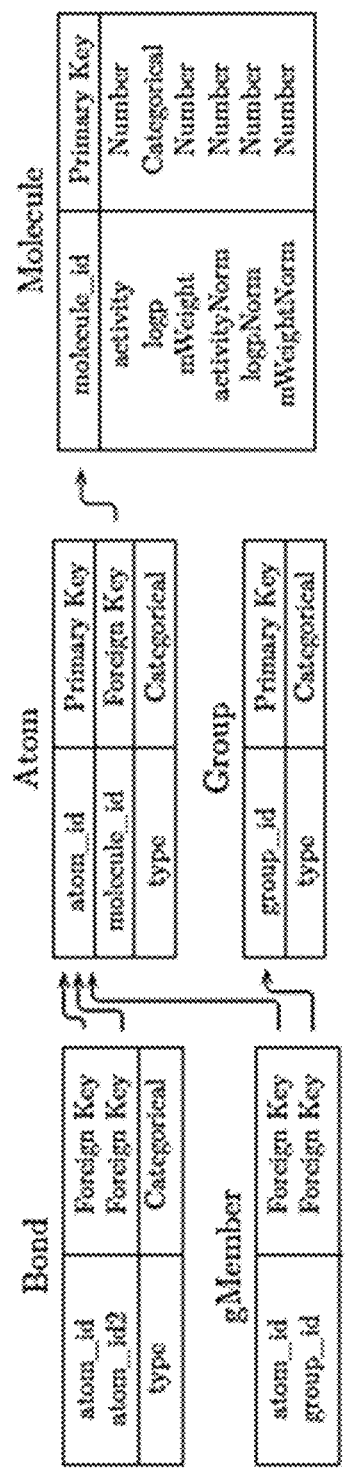
FIG. 12 illustrates the schema for the biodegradability dataset obtained from an online relational dataset repository, in accordance with some inventive aspects.

The first dataset describes various chemical compounds in terms of molecules, atoms, and bonds. FIG. 12 shows the layout of this dataset. Molecules comprise multiple atoms. Two atoms are joined by bonds, and multiple atoms can be a part of an atom group.

The prediction problem is the biodegradability of each molecule in water, as measured by the column log p in the Molecule table. The log p value describes the half-life of the biodegradation for the molecule. For this experiment the log p values were discretized into five classes, and the objective was to predict the class that the molecule belongs to.

To create a synthetic database for this prediction problem, the SDV first synthesizes new molecules. From those molecules, it synthesizes new atoms, and from those atoms, it creates new bonds and group members. Note that is it is not necessary to synthesize new groups, because a row in Group is not a child of molecule.

Mutagenesis

Figure 13:
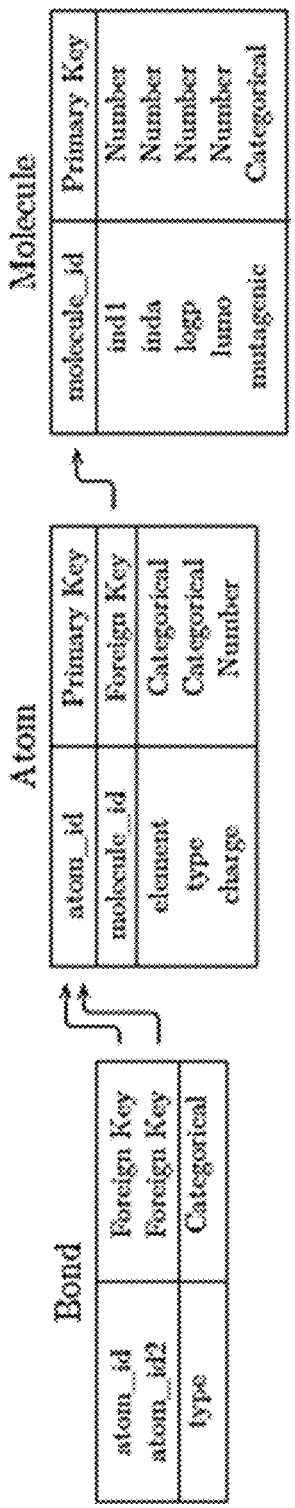
FIG. 13 illustrates the schema for the mutagenesis dataset obtained from an online relational dataset repository, in accordance with some inventive aspects.

Similar to the biodegradability dataset, the mutagenesis dataset is also related to chemical compounds described by molecules, atoms, and bonds as shown by FIG. 13. The overall structure is the same as for biodegradability, but there is no gMember or Group tables associated with this dataset.

The objective of this prediction problem was to predict the mutagenic column in the Molecule table. The term mutagenicity refers to the tendency of a chemical to cause mutations in a strand of DNA. Thus the mutagenic column is binary, and contains either a 'yes' or 'no' value.

Creating synthetic data was straightforward for the SDV: Create new molecules, new atoms for those molecules, and new bonds for those atoms. Thus, all three tables needed to be synthesized for the prediction problem.

Airbnb

Figure 14:
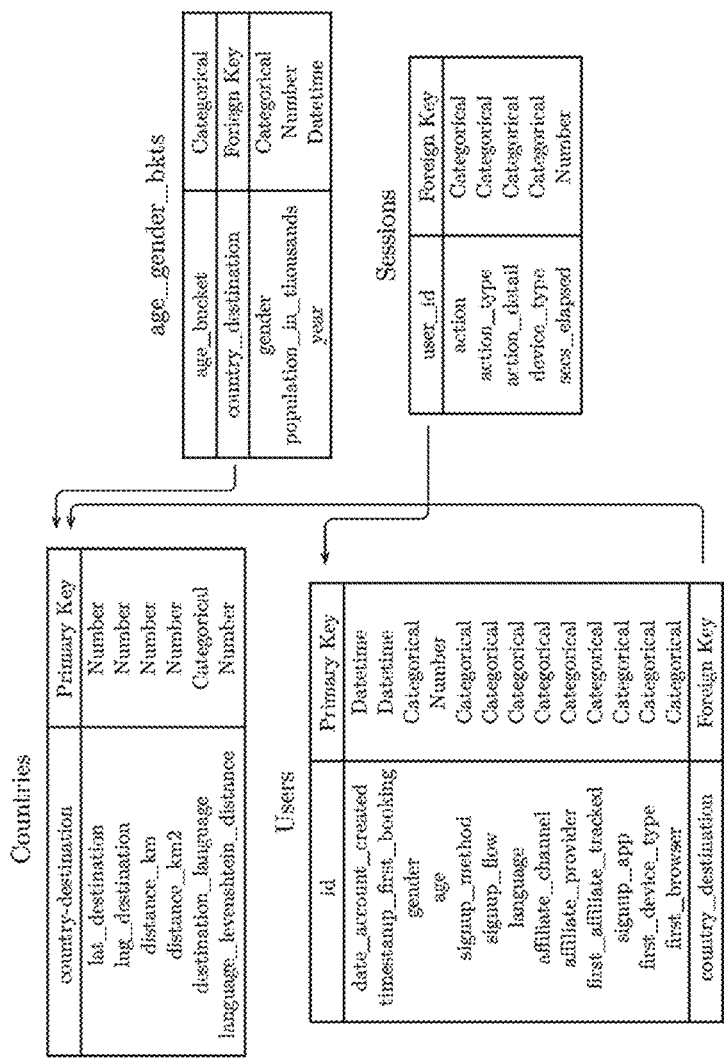
FIG. 14 illustrates the schema for the Airbnb dataset obtained from Kaggle™, in accordance with some inventive aspects.

The Airbnb datasets comes from a Kaggle competition hosted by the lodging site Airbnb™. It includes web access log data from each of its users, as described in FIG. 14. Each user is an account made on Airbnb™, and each session describes a particular access made to the website. The Countries table provides general information about the country, while age_gender_bkt provides information about people traveling to those countries.

The prediction problem for this dataset is country_destination from the Users column. This represents the country that a particular user booked a lodging for. A total of 10 popular countries are labeled using a shortform (for example 'ES' for Spain), while an eleventh category called 'other' encompassed all non-popular countries. Finally, a twelfth category labeled 'NDF' (No Destination Found) indicated that the user did not end up booking lodging using the site.

To create synthetic data for this prediction problem, the SDV synthesized new users, and then synthesized new sessions for those users. It was not necessary to synthesize Countries because it was the parent table of the table containing the prediction problem. It was also unnecessary to synthesize age_gender_bkts because it was not a child of Users.

Rossmann

Figure 15:
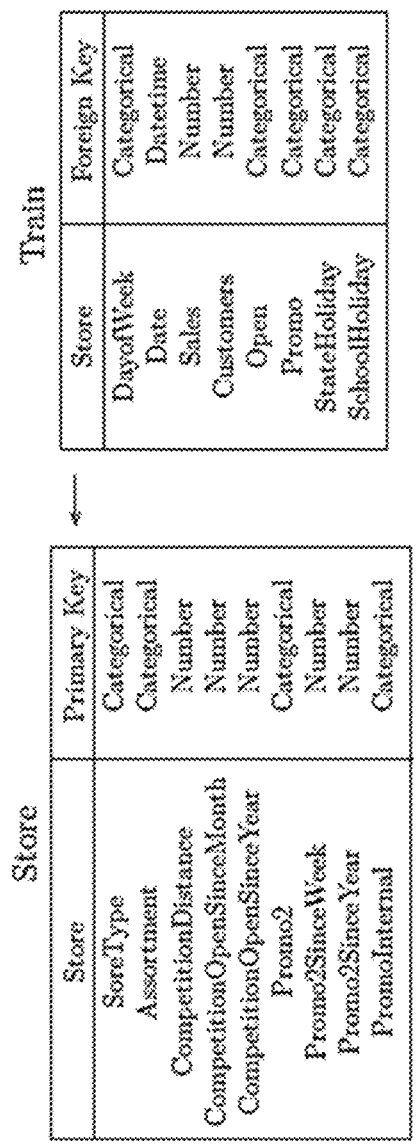
FIG. 15 illustrates the schema from the Rossmann Store dataset obtained from Kaggle™ in accordance with some inventive aspects.

Kaggle's Rossman Store Sales dataset was another competition based on history sales data for different stores in the franchise. The Rossmann™ franchise is one of the largest drug store companies in Germany, and the dataset provided information about each individual store, as well as weekly details about it. This is described in FIG. 15. Each store is a different store location of the Rossmann franchise, and each row in Train corresponds to a particular day in the store.

The prediction problem was the 'Sales' field in the Train table, that represented the total revenue made by the store in that day. Because this was a continuous variable, it was discretized into 8 bins.

Creating a synthetic version of the data meant synthesizing different stores first, and then synthesizing the rows in Train for each of those stores.

Telstra

Figure 16:
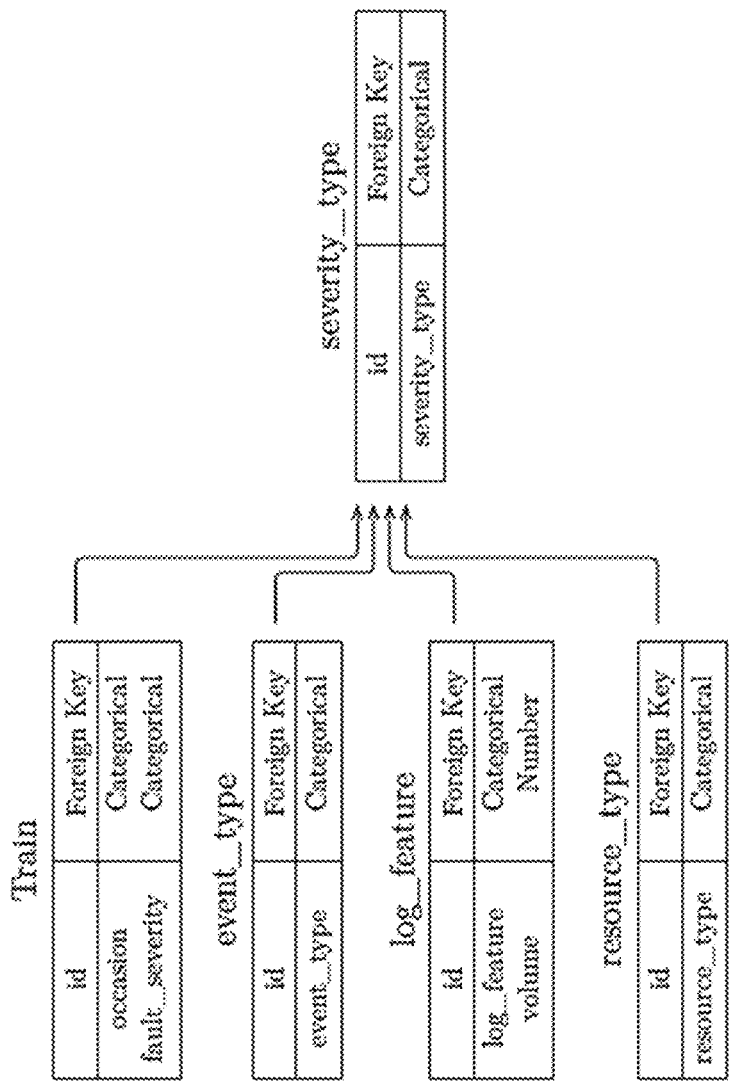
FIG. 16 illustrates the schema for the Telstra dataset obtained from Kaggle™, in accordance with some inventive aspects.

The final dataset was from a Kaggle™ competition with a dataset from Telstra. Telstra is a telecommunications service from Australia that provides mobile phones and broadband internet. The layout of the dataset is described by FIG. 16. Each column named of 'id' represents a location and time. The information is split up by tables with meta-information about the event, log, resources, and severity of a possible network outage.

The prediction problem is to classify the 'fault severity' column of the Train table. This is either '0' for no network outage, '1' for a few outages, or '2' for many outages.

To create a synthesized version for this data, it was only necessary to synthesize new rows of the Train table, because this table had no children.

Crowdsourcing Experiment Setup

For each dataset, the SDV created four versions of data, each a condition for a within-subjects experiment with hired data scientists. These conditions were:

1) Control: The subject is presented with the original version of the dataset.
2) No Noise (Synthesized): The subject is presented with the synthesized output from the SDV's algorithm.
3) Table Noise (Synthesized): The subject is presented with synthesized noised output from the SDV's algorithm. The noise is introduced by taking every covariance value, $\sigma_{ij}$, $i \neq j$ and halving it, effectively reducing the strength of the covariance.
4) Key Noise (Synthesized): The subject is presented with synthesized noised output from the SDV's algorithm. The noise is introduced by randomly sampling a primary key for the foreign key relation instead of performing an inference.

Subjects with some experience analyzing data were hired for the experiment. These data scientists were assigned into one of four groups, which determined the versions of the datasets. This is specified by Table 7.

TABLE 7

The versions of each dataset that were available to each experiment group. While this setup may be biased to some ordering effects, it ensures that a single group receives differently synthesized versions of different datasets.

| Group | Biodegrad-ability | Mutagenesis | Airbnb | Rossmann | Telstra |
| --- | --- | --- | --- | --- | --- |
| 0 | control | table noise | key noise | no noise | control |
| 1 | no noise | key noise | control | table noise | no noise |
| 2 | table noise | control | no noise | key noise | table noise |
| 3 | key noise | no noise | table noise | control | key noise |

All subjects were given a briefing in which they were told to write complex features for each of the datasets. In some inventive aspects, Feature Factory was used as the interface for conducting the experiment. Each dataset was exposed to the subjects as a separate iPython notebook. The notebook contained some background information about the domain, as well as access to a variable dataset that contained a list of table objects belonging to the dataset.

Subjects were not told which version of the data they were given. In order to test their features, subjects were provided with a method called cross validate that automatically computed their features and returned an accuracy score based on their version of the dataset. Finally, when subjects finished and submitted their features, Feature Factory saved the script, which was then used for analysis.

Results

In this experiment, data was collected from 15 different subjects, each of whom had completed 3 or 4 out of the 5 datasets. When interpreting the submitted features, the three questions that were explored were:

Did the synthesized data provide adequate feedback about how well the features would predict real data?

Was there a difference in the crowd's performance in terms of predictive accuracy when they were given original vs. synthetic data?

On a subjective note, did the data scientists using synthetic data feel confused?

Answering each question required different analysis from the submitted features.

Adequate Feedback

If data scientists were to use synthesized data for all their work, they must be reasonably certain that what they produce will perform just as well on the real version of the data. This means that the synthesized data should provide accurate feedback about the data scientist's work.

Typically, data science or feature engineering is an iterative process. Data scientists write features, check their performance, and attempt to improve based on the feedback. While a direct mapping between performance of a feature on synthesized data to real data is not expected, the following can be expected: Let $f_1$ and $f_2$ be two different sets of features. Let $A_s$ be the accuracy function on the synthetic dataset, and $A_r$ be the accuracy function on the real data. If $A_s(f_1) \leq A_s(f_2)$, then it should be the case that $A_r(f_1) \leq A_r(f_2)$. This means that if the data scientist submits $f_2$ instead of $f_1$, it will improve accuracy for synthetic and real data.

To test for this, following steps were performed for each subject's submitted work:

1) Let c be the original control dataset. Let v be the version of the dataset that this subject was given.
2) If c≠v, split v into a train set and validation set.
3) Use the train split to create a model using the submitted features, f.
4) Record the accuracy of f on the validation split. This is the synthetic score, $A_s(f)$.
5) Now use f to predict values in the original dataset, c. Record the accuracy as the real score, $A_r(f)$.

Thus, for every subject who was not in the control group, a synthetic score can be calculated, $A_S(f)$, and a corresponding real score can be calculated, $A_r(f)$ for their features. The synthetic score simulates the data scientist's estimate of how accurate their work is. The real score is the actual accuracy.

Hypothesis: There is a strong correlation between the synthetic score and the real score for each subject's work. A generally positive correlation means that the synthesized datasets give feedback that reasonably estimates the correct feedback. This implies that the synthesized data can be used successfully for data science.

Figure 17:
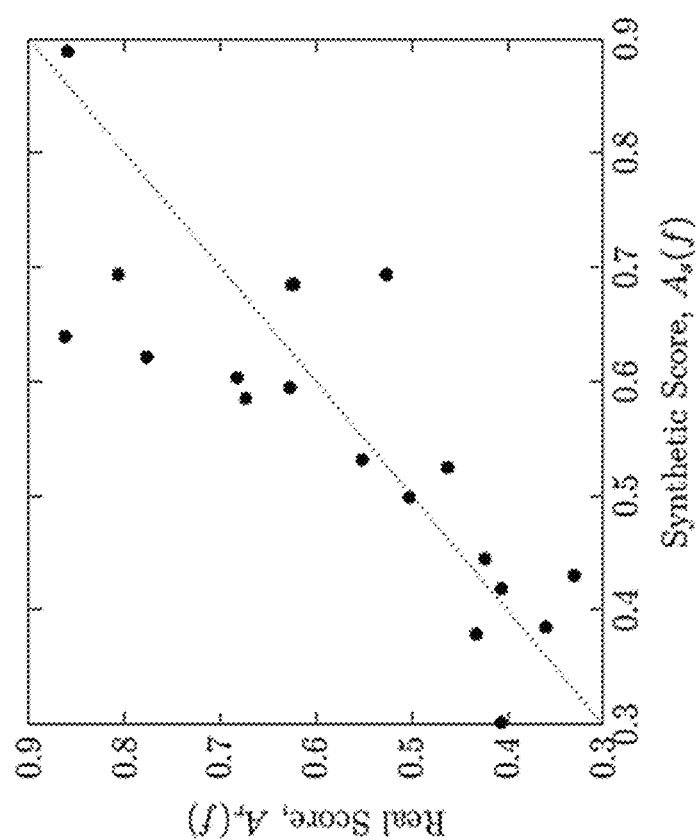
FIG. 17 shows the results for synthetic score on the synthesized datasets vs. real score on the original dataset, in accordance with some inventive aspects.

FIG. 17 shows a scatter plot of the synthetic score vs. the real score for all subjects across all datasets they submitted answers for. The dotted line provides a reference for where synthetic score is exactly equal to the real score. The control group's data is not included in this plot. A linear regression test on the data shows that the correlation is statistically significant ($r^2=0.687$, p<0.001). Furthermore, the slope is 0.970 and y-intercept is 0.034, indicating that the synthetic score closely predicts the test score.

Afterwards, a 2-sample paired t-test was performed on each submission's synthetic and accuracy score. The result showed that there was no significant difference between the two scores (t=0.812, p=0.427). This enables to conclude that $A_r(f) \approx A_s(f)$, a tighter constraint than we had initially set out to prove. It supports the belief that synthetic data provides adequate feedback to the data scientist. Hence, the data scientist can use the synthetic data to reasonably gage the usefulness of their work.

Accuracy

Another question is how a synthesized version of the dataset might affect the overall accuracy of the model, as compared to the original dataset. Even if the generated data provided consistent feedback to the subject, it would be of no use if the data scientist wasn't able to achieve high accuracy.

To test this, a train-validate split was performed on all versions of the dataset to train models for each subject. To calculate the overall test score, an external test set was used that was unavailable to the subjects.

Non-Kaggle Data: 25% of the data was taken out prior to inputting the data in the SDV. This 25% becomes a test set because no data scientist in the control group had access to it, and no synthetic data was created from it.

Kaggle Data: Kaggle™ provides an online test set for their competitions. Kaggle™ does not provide the solutions, so the subject's predictions were submitted and the score that Kaggle™ reported was recorded.

The test scores between the control groups, and the other groups were compared.

Figure 18:
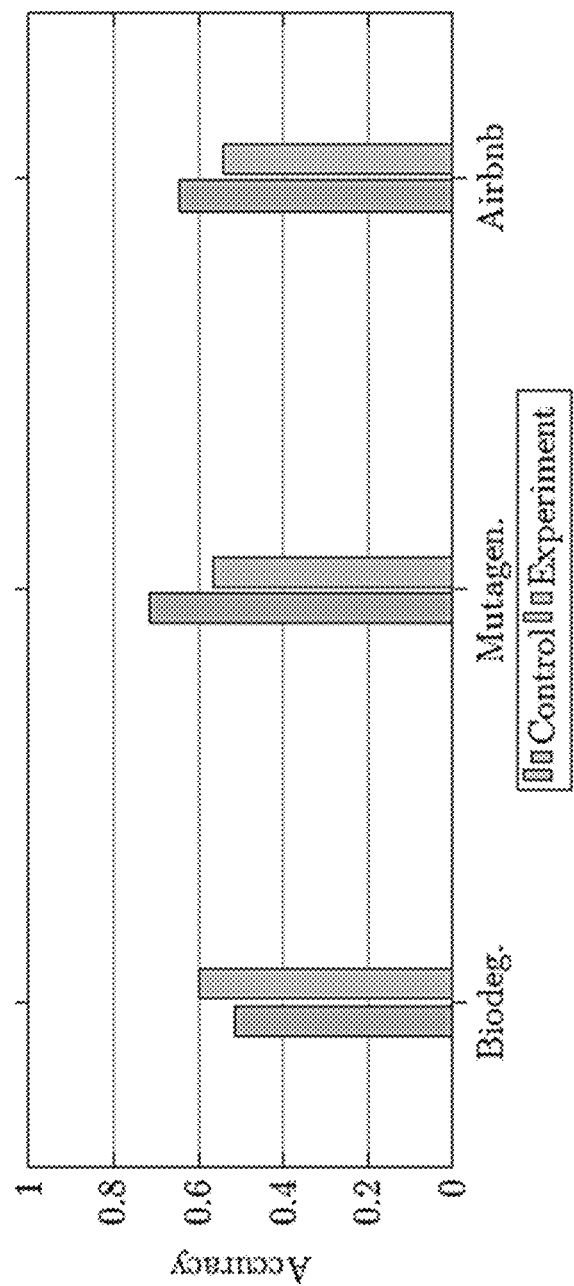
FIG. 18 is a graph containing the median accuracies of the control vs. experimental groups for all datasets, in accordance with some inventive aspects.

Hypothesis: The test scores between the control group and the other groups will not be different. This would show that data scientists can use synthetic data to submit work that is just as accurate as work done using the real data. FIG. 18 illustrates the differences in accuracies per dataset. Table 8 shows preliminary results from a 2-sample independent t-test performed between the control and experiment groups.

TABLE 8

An accuracy comparison for control vs. non-control groups, broken down by each dataset. Results from the t-test, as well as a one-sided p-value are provided for each dataset.

| Dataset | t-statistic | p-value |
|---|---|---|
| Biodegradability | −0.558 | 0.701 |
| Mutagnesis | 1.15 | 0.139 |
| Airbnb | 0.372 | 0.364 |

Overall, it was found that there is no statistically significant difference between the accuracy scores of subjects with control data and subjects with generated data. This confirms the belief that scientists can easily work with synthesized data as they can with control data. It remains to be seen how the levels of noise in the synthesized data affect the accuracy.

Subject Findings

Finally subjective feedback provided by the data scientists were considered. In particular, the questions different subjects asked to see if they were confused by the data they were provided were observed.

A large majority of the questions were about technical issues with Feature Factory or the experimental setup that were unrelated to the synthesized data. Some users were confused about the relations that existed between the tables. One subject in particular did not understand how two columns of the bond table could be foreign keys to the atom table in the Mutagenesis dataset (FIG. 13). Other users defaulted to writing features from the target table only. The subjects were encouraged to join the tables to explore the entire dataset.

Only one question was related to the actual values in the dataset. A subject in group 3 indicated that the ages column in the Users table of the Airbnb™ dataset (FIG. 14) had unrealistic ages. This user's data was synthesized with table noise. However, upon closer inspection, it appears that the original data for Airbnb™ also had unrealistic data in the ages column (max age was 2004). The SDV synthesized data within the correct bounds when compared to the control data.

Ultimately, it was found that the SDV successfully modeled each of the relational datasets, and used the generative models to synthesize data that data scientists could realistically work with. Thus, the results show promise in using the SDV for data science purposes.

Key Findings

The SDV was successful for each of the goals for generalizability, usability, and accuracy. The SDV can be applied generally to a variety of relational datasets. During the experimentation phase, the SDV was applied to Biodegradability, Mutagenesis, Airbnb, Rossmann, Telstra, and industrial datasets. The SDV was able to model the relational data automatically for each of these datasets, with no changes to the code.

The SDV can synthesize data at a variety of granularities for different test purposes. The work with the software consulting firm, Mutability, and Rossmann datasets required the SDV to synthesize the entire database, with all the tables and their corresponding foreign key relations. The Biodegradability dataset required the SDV to synthesize all tables except for one (the Group table), while ensuring that all key relations between existing and synthesized tables were accurate. Finally, the Telstra and Airbnb datasets required the SDV to synthesize a single table whose foreign keys accurately referenced their parents. The versatility of SDV shows that it can be adapted to many types of problems.

The synthetic output from SDV can replace original data for the purposes of data science. The results indicate that data scientists were able to work as effectively with the synthetic output as they were with the original data. In particular, a regression between the cross validation and test score showed that the synthetic data gave the correct feedback to data scientists when validating their models (p<0.001). A comparison in overall accuracies between the original and synthetic data showed no statistically significant effects between the type of data and the data scientist's ultimate performance on the test set.

This disclosure includes systems, apparatus, and methods to:

1. Design CPA, an approach that builds a generative model for a table that has external table dependencies. When layered recursively, this forms the RCPA, which models an entire relational database.

2. Create a method for inference and synthetic data generation across multiple tables. This uses covariance update rules for generative models as its foundation.

3. Implement the SDV, an end-to-end system that allows users to build generative models for relational databases, and use the model to synthesize data.

4. Demonstrate that the SDV meets its goals for usability and generalizability by using it to model 6 different datasets from a combination of sources: major software consulting firm, the relational database repository, and Kaggle™

5. Evaluate the SDV's ability to synthesize data for sample databases by working a real-world complex relational database from our sponsor. Demonstrate that the SDV synthesizes data that be used for testing.

6. Formulate metrics to quantify how much synthesized data affects the ability to solve a prediction problem.

7. Perform experiment using Feature Factory, and analyze submitted features to demonstrate that synthetic output from SDV:

gives effective feedback regarding its application to real data does not interfere with the data scientists' ability to make accurate predictions does not produce confusing data that impedes the data scientists' progress Thus, the SDV successfully builds generative models for relational databases, and is a viable solution for synthesizing data.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method for storing and retrieving data in a computer memory to improve the functionality of a computer comprising the computer memory by protecting the privacy of first data contained in a relational database stored in the computer memory, the method comprising:
   A) transforming the relational database to provide a restructured relational database and generate, via at least one first processor of the computer, a statistical model of the restructured relational database; and
   B) synthesizing, via the at least one first processor of the computer or another processor of another computer, anonymized data based on the statistical model generated in A) of the restructured relational database, wherein the anonymized data statistically mimics but does not duplicate at least a portion of the first data in the relational database and thereby protects the privacy of at least the portion of the first data.

2. The method of claim 1, wherein:
   the restructured relational database comprises a plurality of tables;
   each table of the plurality of tables represents a unique object and comprises:

a plurality of rows respectively representing different instances of the unique object; and a plurality of columns respectively representing different attributes of the different instances of the unique object, wherein:

the plurality of rows and the plurality of columns form a plurality of cells containing object instance data for the different instances of the unique object, wherein the object instance data constitutes at least some of the first data contained in the relational database; and a first column of the plurality of columns is a private key column containing unique private keys for respective rows of the plurality of rows in the table, the unique private keys respectively corresponding to the different instances of the unique object;

the plurality of tables includes at least one parent table, at least one child table, and at least one leaf table;

for each child table of the plurality of tables, a second column of the plurality of columns is a foreign key column containing parent private keys also contained in the private key column of a single parent table of the plurality of tables, such that the foreign key column of each child table references only one parent table of the plurality of tables; and for the at least one leaf table, none of the private keys in the private key column of the at least one leaf table appears in the foreign key column of any child table in the relational database, such that no parent table of the plurality of tables is the at least one leaf table.

3. The method of claim 2, wherein A) comprises:

formatting each table of the plurality of tables as a corresponding separate file that includes table metadata specifying, for each column of the plurality of columns of the table, a data type for the object instance data in the column.

4. The method of claim 3, wherein the data type for the object instance data in the column is one of:

a numerical value type;

a category type;

a time and/or date type;

an identifier type for a private key, or a parent private key and the single parent table containing the parent private key; and a text type.

5. The method of claim 4, wherein formatting each table of the plurality of tables as a corresponding separate file comprises:

for each column of the table that includes at least one missing value for the object instance data, including in the corresponding separate file:

the column of the table that includes the at least one missing value, wherein the at least one missing value is filled-in by randomly choosing one non-missing value in the column; and an additional column, wherein the data type for the additional column is the category type, and wherein the additional column includes a first indication for each non-missing value in the column and a second indication for each missing value in the column.

6. The method of claim 4, wherein formatting each table of the plurality of tables as a corresponding separate file comprises:

for each column of the table having the category type or the time and/or date type for the data type:

converting each object instance data in the column from the category type or the time and/or date type to the numerical type, thereby generating converted object instance data of the numerical type; and including in the corresponding separate file a replacement column for the column, wherein the replacement column includes the converted object instance data of the numerical type.

7. The method of claim 6, wherein:

the column has the category type for the data type;

the object instance data for the column includes a plurality of categories; and converting each object instance data in the column from the category type to the numerical type comprises:

determining a cumulative probability for each category of the plurality of categories;

splitting an interval between zero and one into a plurality of sections based on the cumulative probability for each category of the plurality of categories;

assigning each section of the plurality of sections to a one category of the plurality of categories based on a corresponding cumulative probability for the one category;

converting the object instance data having the one category by selecting a value in the corresponding assigned section; and assigning the selected value as the converted object instance data of the numerical type.

8. The method of claim 7, wherein selecting a value in the corresponding assigned section comprises sampling from a truncated Gaussian distribution having a mean at a center of the corresponding assigned section.

9. The method of claim 6, wherein:

the column has the time and/or date type for the data type;

the object instance data for the column includes a plurality of times and/or dates; and converting each object instance data in the column from the time and/or date type to the numerical type comprises converting each time and/or date of the plurality of times and/or dates to a number of seconds before or after a predetermined reference time.

10. The method of claim 2, wherein A) comprises:

for each table of the plurality of tables, electronically generating a descriptive statistical model of the table by:

A1) calculating respective column probability distributions for at least some of the columns of the plurality of columns based on the object instance data contained in the at least some of the columns;

A2) calculating a plurality of covariances for the respective column probability distributions calculated in A1); and A3) storing in the computer memory representative parameters for the respective column probability distributions and the plurality of covariances as the descriptive statistical model for the table.

11. The method of claim 10, wherein in A1), each column probability distribution of the respective column probability distributions is one of:

a Gaussian distribution, wherein the representative parameters include a first mean, a first variance, and a first indicator for the Gaussian distribution;

a truncated Gaussian distribution, wherein the representative parameters include a second mean, a second variance, a first minimum value, a first maximum value, and a second indicator for the truncated Gaussian distribution;

a uniform distribution, wherein the representative parameters include a second minimum value, a second maximum value, and a third indicator for the uniform distribution;

a beta distribution, wherein the representative parameters include an alpha parameter, a beta parameter, and a fourth indicator for the beta distribution; and an exponential distribution, wherein the representative parameters include a decay parameter and a fifth indicator for the exponential distribution.

12. The method of claim 11, wherein A2) comprises:

A2a) applying a Gaussian Copula process to each column probability distribution of the respective column probability distributions to convert the respective column probability distributions to respective standard normal distributions; and A2b) calculating the plurality of covariances for the respective column probability distributions based on the respective standard normal distributions in A2a).

13. The method of claim 10, wherein B) comprises:

for at least one parent table of the plurality of tables that is not a child table, synthesizing anonymized row data for at least one row of the at least one parent table based on the descriptive statistical model for the at least one parent table.

14. The method of claim 10, wherein for each parent table of the plurality of tables, A) further comprises, prior to A1):

A-2) adding to the parent table a plurality of derived columns so as to generate an extended parent table including a plurality of extended rows, wherein each extended row of the extended parent table contains duplicate object instance data from the plurality of columns of the parent table; and A-1) calculating representative statistics for all child tables of the plurality of tables that reference the parent table, and placing the calculated representative statistics in the plurality of derived columns of the extended parent table.

15. The method of claim 14, wherein A) further comprises, prior to A1):

determining a first parent table of the plurality of tables for which each child table that references the first parent table is a leaf table;

performing A-2) and A-1) on the first parent table to generate an extended first parent table; and subsequently performing A-2) and A-1) on a second parent table of the plurality of tables, wherein the extended first parent table is a first child table that references the second parent table.

16. The method of claim 14, wherein A-1) comprises:

for each row of the parent table:

1) determining a first number m of child tables of the plurality of tables containing a parent private key in the foreign key columns of the m child tables that matches the unique private key in the private key column of the parent table for the row of the parent table;

2) for each child table of the m child tables:

2a) determining all matching child rows in the child table containing the parent private key that matches the unique private key for the row of the parent table; and 2b) creating a conditional data table including the matching child rows;

3) for each conditional data table corresponding to one of the m child tables, generating a set of conditional parameters by:

3a) calculating respective column probability distributions for at least some of the columns in the conditional data table based on the object instance data present in the at least some of the columns; and 3b) calculating a plurality of covariances for the respective column probability distributions calculated in 3a);

4) for each set of conditional parameters corresponding to one of them child tables, placing the set of conditional parameters in at least some of the plurality of derived columns of an extended row of the extended parent table that corresponds to the row of the parent table; and 5) placing a second number n, representing a total of all matching child rows in all of the m child tables, in at least one of the plurality of derived columns of the extended row of the extended parent table.

17. The method of claim 16, wherein in A-1) 3a), each column probability distribution of the respective column probability distributions for the at least some of the columns in the conditional data table is one of:

a Gaussian distribution, wherein the set of conditional parameters includes a first mean, a first variance, and a first indicator for the Gaussian distribution;

a truncated Gaussian distribution, wherein the set of conditional parameters includes a second mean, a second variance, a first minimum value, a first maximum value, and a second indicator for the truncated Gaussian distribution;

a uniform distribution, wherein the set of conditional parameters includes a second minimum value, a second maximum value, and a third indicator for the uniform distribution;

a beta distribution, wherein the set of conditional parameters includes an alpha parameter, a beta parameter, and a fourth indicator for the beta distribution; and an exponential distribution, wherein the set of conditional parameters includes a decay parameter and a fifth indicator for the exponential distribution.

18. The method of claim 17, wherein A-1) 3b) comprises:

applying a Gaussian Copula process to each column probability distribution of the respective column probability distributions to convert the respective column probability distributions to respective standard normal distributions; and calculating the plurality of covariances for the respective column probability distributions based on the respective standard normal distributions.

19. The method of claim 16, wherein A) further comprises, prior to A1), storing in memory each extended parent table, and wherein for each extended parent table:

A1) comprises calculating respective column probability distributions for:

at least some of the columns of the plurality of columns based on the object instance data contained in the at least some of the columns; and the plurality of derived columns based on the conditional parameters and the second numbers n contained in the plurality of derived columns;

A2) comprises calculating the plurality of covariances for the respective column probability distributions calculated in A1); and A3) storing in the computer memory the representative parameters for the respective column probability distributions and the plurality of covariances as the descriptive statistical model for the extended parent table.

20. The method of claim 19, wherein in A1), each column probability distribution of the respective column probability distributions is one of:
   a Gaussian distribution, wherein the representative parameters include a first mean, a first variance, and a first indicator for the Gaussian distribution;
   a truncated Gaussian distribution, wherein the representative parameters include a second mean, a second variance, a first minimum value, a first maximum value, and a second indicator for the truncated Gaussian distribution;
   a uniform distribution, wherein the representative parameters include a second minimum value, a second maximum value, and a third indicator for the uniform distribution;
   a beta distribution, wherein the representative parameters include an alpha parameter, a beta parameter, and a fourth indicator for the beta distribution; and
   an exponential distribution, wherein the representative parameters include a decay parameter and a fifth indicator for the exponential distribution.

21. The method of claim 20, wherein A2) comprises:
   A2a) applying a Gaussian Copula process to each column probability distribution of the respective column probability distributions to convert the respective column probability distributions to respective standard normal distributions; and
   A2b) calculating the plurality of covariances for the respective column probability distributions based on the respective standard normal distributions in A2a).

22. The method of claim 19, wherein B) comprises:
   for at least one child table of the plurality of tables, synthesizing anonymized row data for at least one row of the at least one child table based on the sets of conditional parameters contained in a first extended row of a first extended parent table identified by a first parent private key in the foreign key column of the at least one child table.

23. The method of claim 19, wherein B) comprises:
   for at least one extended parent table that is not a child table, synthesizing anonymized parent row data for at least one extended row of the at least one extended parent table based on the descriptive statistical model for the at least one extended parent table, wherein the anonymized parent row data includes anonymized conditional parameters to synthesize anonymized child row data.

24. The method of claim 23, wherein B) comprises:
   for the at least one extended parent table that is not a child table, synthesizing anonymized parent row data for each row of the at least one extended parent table based on the descriptive statistical model for the at least one extended parent table so as to generate an anonymized extended parent table including a plurality of synthesized rows, wherein each synthesized row of the plurality of synthesized rows includes anonymized conditional parameters to synthesize anonymized child row data; and
   for each row of the plurality of synthesized rows in the anonymized extended parent table, synthesizing the anonymized child row data based on the anonymized conditional parameters.

25. A method of generating a statistical model of a relational database containing first data, and synthesizing anonymized data based on the generated statistical model, to mimic at least some of the first data in the relational database and thereby protect the privacy of the first data, wherein:
   the relational database comprises a plurality of tables;
   each table of the plurality of tables represents a unique object and comprises:
      a plurality of rows respectively representing different instances of the unique object; and
      a plurality of columns respectively representing different attributes of the different instances of the unique object, wherein:
         the plurality of rows and the plurality of columns form a plurality of cells containing object instance data for the different instances of the unique object, wherein the object instance data constitutes at least some of the first data contained in the relational database; and
         a first column of the plurality of columns is a private key column containing unique private keys for respective rows of the plurality of rows in the table, the unique private keys respectively corresponding to the different instances of the unique object;
   the plurality of tables includes at least one parent table, at least one child table, and at least one leaf table;
   for each child table of the plurality of tables, a second column of the plurality of columns is a foreign key column containing parent private keys also contained in the private key column of a single parent table of the plurality of tables, such that the foreign key column of each child table references only one parent table of the plurality of tables; and
   for the at least one leaf table, none of the private keys in the private key column of the at least one leaf table appears in the foreign key column of any child table in the relational database, such that no parent table of the plurality of tables is the at least one leaf table, the method comprising:
   A) for each table of the plurality of tables, electronically generating a descriptive statistical model of the table by:
      A1) calculating respective column probability distributions for at least some of the columns of the plurality of columns based on the object instance data present in the at least some of the columns; and
      A2) calculating a plurality of covariances for the respective column probability distributions calculated in A1); and
   B) for at least one table of the plurality of tables, synthesizing anonymized row data for at least one row of the at least one table based on one of:
      B1) the respective column probability distributions and the plurality of covariances for the at least one table, if the at least one table does not include a foreign key column including parent private keys; and
      B2) if the at least one table does include the foreign key column, conditional parameters contained in a first parent row of a first parent table identified by a first parent private key in the foreign key column of the at least one table, wherein the conditional parameters contained in the first parent row include conditional column probability distributions and conditional covariances calculated from all child rows of the first parent row.

26. At least one non-transitory computer-readable medium encoded with instructions that, when executed by at least one first processor of a first computer, perform a method for storing and retrieving data in a computer memory of the first computer or a second computer to improve the functionality of the first computer or the second computer by protecting the privacy of first data contained in a relational database stored in the computer memory, the method comprising:

- A) transforming the relational database to provide a restructured relational database and generate, via the at least one first processor of the first computer, a statistical model of the restructured relational database; and
- B) synthesizing, via the at least one first processor of the first computer, anonymized data based on the statistical model generated in A) of the restructured relational database, wherein the anonymized data statistically mimics but does not duplicate at least a portion of the first data in the relational database and thereby protects the privacy of at least the portion of the first data.

* * * * *